(12) United States Patent
Hesse et al.

(10) Patent No.: US 7,258,922 B2
(45) Date of Patent: *Aug. 21, 2007

(54) COMPOSITIONS, METHODS AND DEVICES FOR ENHANCING LANDSCAPING OR MARKER MATERIALS

(75) Inventors: Anthony Hesse, Toms River, NJ (US); Paul Kittle, West Chester, PA (US)

(73) Assignee: THI International, Inc., Toms River, NJ (US)

( * ) Notice: Subject to any disclaimer, the term of this patent is extended or adjusted under 35 U.S.C. 154(b) by 45 days.

This patent is subject to a terminal disclaimer.

(21) Appl. No.: 10/453,070

(22) Filed: Jun. 3, 2003

(65) Prior Publication Data

US 2004/0187381 A1    Sep. 30, 2004

Related U.S. Application Data

(63) Continuation-in-part of application No. 10/405,046, filed on Mar. 31, 2003.

(51) Int. Cl.
*B32B 5/16* (2006.01)

(52) U.S. Cl. .................. 428/403; 428/404; 428/405; 428/406; 428/407; 106/31.97

(58) Field of Classification Search ............... 428/403, 428/404, 405, 406, 407; 106/31.97
See application file for complete search history.

(56) References Cited

U.S. PATENT DOCUMENTS

| | | | |
|---|---|---|---|
| 2,679,385 A | 5/1954 | Lodige et al. |
| 3,812,615 A | 5/1974 | Jamison |
| 3,847,571 A | 11/1974 | Cole, Jr. |
| 3,871,130 A | 3/1975 | Lavo et al. |
| 3,881,278 A | 5/1975 | Videen |
| 3,932,319 A | 1/1976 | Clendinning et al. |
| 4,000,992 A | 1/1977 | Cole, Jr. |
| 4,050,944 A * | 9/1977 | Cartwright ............ 106/31.97 |
| 4,067,140 A | 1/1978 | Thomas |
| 4,120,458 A | 10/1978 | Hughes |
| 4,210,289 A | 7/1980 | Arnoldy |
| 4,232,480 A | 11/1980 | Videen |
| 4,297,810 A | 11/1981 | Hansford |
| 4,337,117 A | 6/1982 | Bodendorf et al. |
| 4,339,890 A | 7/1982 | Koenig et al. |
| 4,369,597 A | 1/1983 | Leep et al. |
| 4,379,168 A | 4/1983 | Dotolo |
| 4,400,220 A | 8/1983 | Cole, Jr. |
| 4,406,548 A | 9/1983 | Haws |
| 4,474,680 A | 10/1984 | Kroll |
| 4,561,905 A | 12/1985 | Kittle |
| 4,574,855 A | 3/1986 | Jörgensen et al. |
| 4,587,123 A | 5/1986 | Price |
| 4,624,575 A | 11/1986 | Lantz |
| 4,635,862 A | 1/1987 | West et al. |
| 4,717,081 A | 1/1988 | Hamilton |
| 4,732,817 A | 3/1988 | Lotz et al. |
| 4,736,781 A | 4/1988 | Morey et al. |
| 4,759,930 A | 7/1988 | Granirer et al. |
| 4,770,217 A | 9/1988 | Strong |
| 4,780,143 A | 10/1988 | Roe |
| 4,780,233 A | 10/1988 | Roe |
| 4,788,790 A | 12/1988 | Zeager |
| 4,804,683 A | 2/1989 | Steltenkamp |
| 4,816,220 A | 3/1989 | Roychowdhury |
| 4,879,659 A | 11/1989 | Bowlin et al. |
| 4,932,156 A | 6/1990 | Underwood |
| 4,954,175 A | 9/1990 | Ito et al. |
| 4,961,539 A | 10/1990 | Deem |
| 4,990,373 A | 2/1991 | Kittle |
| 5,039,348 A | 8/1991 | Cole, Jr. et al. |
| 5,048,669 A | 9/1991 | Swinderman |
| 5,066,428 A | 11/1991 | Manlowe et al. |
| 5,069,723 A | 12/1991 | Cole, Jr. et al. |
| 5,071,075 A | 12/1991 | Wiens |
| 5,079,000 A | 1/1992 | Takahashi et al. |
| 5,079,036 A | 1/1992 | Roe et al. |
| 5,080,534 A | 1/1992 | Goodson et al. |
| 5,082,188 A | 1/1992 | Urich |
| 5,082,500 A | 1/1992 | Nachtman et al. |
| 5,096,616 A | 3/1992 | Kittle |
| 5,105,577 A | 4/1992 | Hedges |
| 5,111,859 A | 5/1992 | Tohkala et al. |
| 5,133,500 A | 7/1992 | Simpson |
| 5,151,123 A | 9/1992 | Kviesitis |
| 5,153,014 A | 10/1992 | Cole, Jr. |
| 5,181,663 A | 1/1993 | Dorscht et al. |
| 5,192,587 A | 3/1993 | Rondy |
| 5,207,391 A | 5/1993 | Anderson |
| 5,215,786 A | 6/1993 | Kittle |
| 5,225,095 A | 7/1993 | DiMaio et al. |
| 5,251,398 A | 10/1993 | Balassa |
| 5,254,364 A | 10/1993 | Kviesitis |
| 5,258,738 A | 11/1993 | Schat |
| 5,264,029 A | 11/1993 | Kviesitis |
| 5,270,083 A | 12/1993 | Lotz |

(Continued)

FOREIGN PATENT DOCUMENTS

| | | |
|---|---|---|
| EP | 0 860 491 A1 | 8/1998 |
| EP | 1116434 A1 | 7/2001 |
| WO | WO 02/060290 | 8/2002 |

OTHER PUBLICATIONS

Becker Underwood Product Information on Termitafoam, webpages.

*Primary Examiner*—Leszek Kiliman
(74) *Attorney, Agent, or Firm*—Brown & Michaels, PC

(57) ABSTRACT

A method for treating a marker material includes combining at least one treatment for a marker material, a foaming agent and a solvent to form a marker composition, foaming the marker composition to form a foamed marker composition, and applying the foamed marker composition to a marker material.

13 Claims, 18 Drawing Sheets

U.S. PATENT DOCUMENTS

| | | |
|---|---|---|
| 5,300,438 A | 4/1994 | Augspurger et al. |
| 5,302,017 A | 4/1994 | Platek et al. |
| 5,308,653 A | 5/1994 | Rondy |
| 5,314,126 A | 5/1994 | Alvarez |
| 5,323,975 A | 6/1994 | Fulghum, Jr. |
| 5,344,025 A | 9/1994 | Tyler et al. |
| 5,349,999 A | 9/1994 | Peterson et al. |
| 5,358,738 A | 10/1994 | Sawka |
| 5,372,316 A | 12/1994 | Bateman |
| 5,394,912 A | 3/1995 | Hume |
| 5,396,731 A | 3/1995 | Byrne |
| 5,413,286 A | 5/1995 | Bateman |
| 5,419,502 A | 5/1995 | Morey |
| 5,456,733 A | 10/1995 | Hamilton, Jr. |
| 5,458,877 A | 10/1995 | Obayashi et al. |
| 5,466,459 A | 11/1995 | Wilson |
| 5,474,186 A | 12/1995 | Fulghum, Jr. et al. |
| 5,494,514 A | 2/1996 | Goodson et al. |
| 5,509,256 A | 4/1996 | Groth |
| 5,527,760 A | 6/1996 | Rensing et al. |
| 5,556,033 A | 9/1996 | Nachtman |
| 5,556,881 A | 9/1996 | Grahn Marisi |
| 5,562,956 A | 10/1996 | White, Jr. |
| 5,565,288 A | 10/1996 | Watanabe et al. |
| 5,582,644 A | 12/1996 | Gaddis et al. |
| 5,583,165 A | 12/1996 | Kviesitis |
| 5,612,385 A | 3/1997 | Ceaser et al. |
| 5,643,360 A | 7/1997 | Rensing et al. |
| 5,647,417 A | 7/1997 | Schaefer et al. |
| 5,649,580 A | 7/1997 | Mierau et al. |
| 5,669,428 A | 9/1997 | Hoover |
| 5,702,780 A | 12/1997 | Tiller et al. |
| 5,711,795 A | 1/1998 | Browning |
| 5,713,525 A | 2/1998 | Morey |
| 5,720,440 A | 2/1998 | Bonner et al. |
| 5,732,827 A | 3/1998 | Dorscht |
| 5,782,580 A | 7/1998 | Aubert et al. |
| 5,795,479 A | 8/1998 | Vogt et al. |
| 5,803,380 A | 9/1998 | Brand et al. |
| 5,819,950 A | 10/1998 | McCloskey |
| 5,842,507 A | 12/1998 | Fellman et al. |
| 5,853,050 A | 12/1998 | Kittle |
| 5,856,024 A | 1/1999 | Parr |
| 5,863,003 A | 1/1999 | Smith |
| 5,865,317 A | 2/1999 | Clinton |
| 5,866,201 A | 2/1999 | Blue |
| 5,873,397 A | 2/1999 | Lequin |
| 5,879,695 A | 3/1999 | Bastiaansen et al. |
| 5,881,959 A | 3/1999 | Hadjinian et al. |
| 5,890,665 A | 4/1999 | Arasmith et al. |
| 5,910,514 A | 6/1999 | Greenberg et al. |
| 5,915,565 A | 6/1999 | Clinton |
| 5,948,474 A | 9/1999 | Tiller et al. |
| 5,950,360 A | 9/1999 | Heinrich et al. |
| 5,950,942 A | 9/1999 | Brand et al. |
| 5,951,992 A | 9/1999 | Wilkins, Jr. |
| 5,998,335 A | 12/1999 | Selga et al. |
| 6,006,921 A | 12/1999 | Zehr |
| 6,026,872 A | 2/2000 | Leitinger |
| 6,029,395 A * | 2/2000 | Morgan ............ 47/9 |
| 6,045,070 A | 4/2000 | Davenport |
| 6,048,377 A | 4/2000 | Kviesitis |
| 6,048,458 A | 4/2000 | Vogt et al. |
| 6,063,355 A | 5/2000 | Fujimura et al. |
| 6,086,002 A | 7/2000 | Frazier et al. |
| 6,096,373 A | 8/2000 | Nachtman et al. |
| 6,101,762 A | 8/2000 | Courtabessis et al. |
| 6,110,271 A | 8/2000 | Skaggs et al. |
| 6,136,430 A | 10/2000 | Johnson ............ 428/331 |
| 6,136,590 A | 10/2000 | Kruse |
| 6,145,591 A | 11/2000 | Boncan et al. |
| 6,159,262 A | 12/2000 | Tumbers |
| 6,162,496 A | 12/2000 | Blue |
| 6,196,284 B1 | 3/2001 | Lequin |
| 6,199,318 B1 | 3/2001 | Stewart et al. |
| 6,207,228 B1 | 3/2001 | Hundt et al. |
| 6,209,259 B1 | 4/2001 | Madigan et al. |
| 6,209,812 B1 | 4/2001 | Jokinen |
| 6,210,955 B1 | 4/2001 | Hayes |
| 6,231,865 B1 | 5/2001 | Hsu et al. |
| 6,250,793 B1 | 6/2001 | Gian |
| 6,251,058 B1 | 6/2001 | Ward et al. |
| 6,251,440 B1 | 6/2001 | Ryan et al. |
| 6,264,715 B1 | 7/2001 | Lamour et al. |
| 6,286,247 B1 | 9/2001 | Brody |
| 6,293,045 B1 | 9/2001 | Morgan |
| 6,299,082 B1 | 10/2001 | Smith |
| 6,301,829 B1 | 10/2001 | Kaufmann |
| 6,314,996 B1 | 11/2001 | Borglum et al. |
| 6,321,804 B1 | 11/2001 | Mangold |
| 6,325,847 B1 | 12/2001 | Christie et al. |
| 6,338,871 B1 | 1/2002 | Shin |
| 6,345,772 B1 | 2/2002 | Bastin et al. |
| 6,360,894 B1 | 3/2002 | Devlin et al. |
| 6,376,566 B1 | 4/2002 | Bergeron et al. |
| 6,379,527 B1 | 4/2002 | Vogt et al. |
| 6,398,140 B1 | 6/2002 | Stieh et al. |
| 6,409,818 B1 | 6/2002 | Johnson ............ 106/608 |
| 6,441,051 B1 | 8/2002 | Wheeler |
| 6,453,608 B1 | 9/2002 | Flanagan et al. |
| 6,491,479 B1 | 12/2002 | Rexius |
| 6,500,896 B1 | 12/2002 | Rajaraman |
| 2001/0008318 A1 | 7/2001 | Mosbaugh |
| 2001/0022047 A1 | 9/2001 | Krysiak et al. |
| 2002/0004951 A1 | 1/2002 | Auger |
| 2002/0081354 A1 | 6/2002 | Botterman et al. |
| 2002/0086122 A1 | 7/2002 | Sakai |
| 2002/0088260 A1 | 7/2002 | Lamour et al. |
| 2002/0119314 A1 | 8/2002 | Coffey |
| 2002/0128366 A1 | 9/2002 | Coffey |
| 2002/0130198 A1 | 9/2002 | Bennett |
| 2002/0147111 A1 | 10/2002 | Sun |
| 2003/0134747 A1 | 7/2003 | Walter et al. |
| 2005/0000389 A1 | 1/2005 | Nungess ............ 106/499 |

* cited by examiner

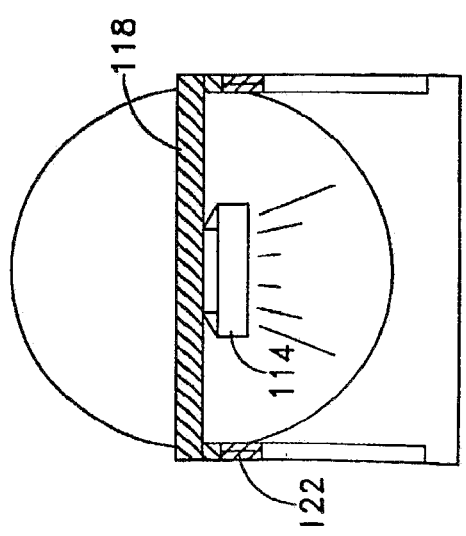
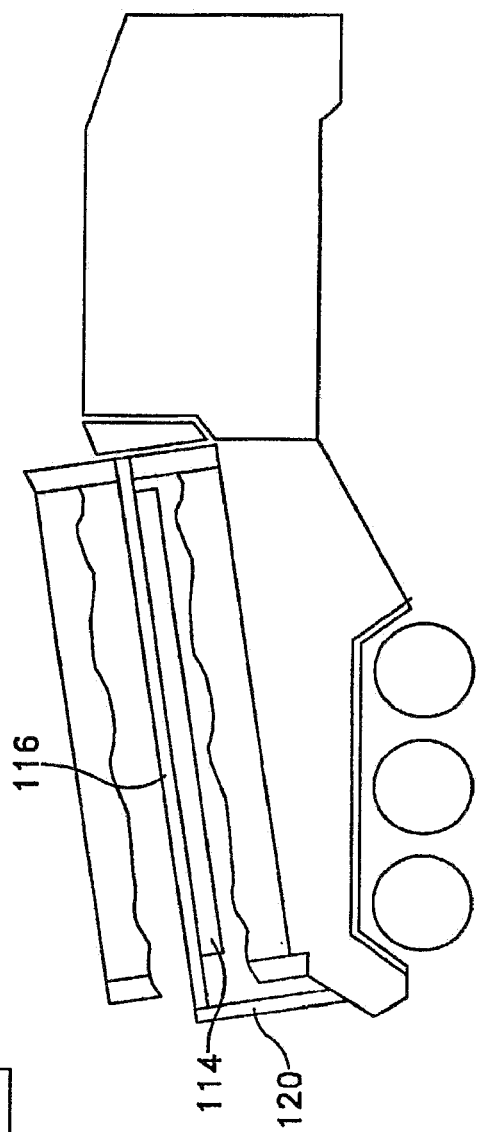
FIG. 11B
FIG. 11A

COMPOSITIONS, METHODS AND DEVICES FOR ENHANCING LANDSCAPING OR MARKER MATERIALS

CROSS REFERENCE TO RELATED APPLICATION

This application is a continuation-in-part application of U.S. patent application Ser. No. 10/405,046, filed Mar. 31, 2003 entitled "Compositions, Methods And Devices For Enhancing Landscaping Materials".

FIELD OF THE INVENTION

This invention relates generally to methods and machines for treating landscaping or marker materials, and more particularly to methods utilizing foam delivery to treat landscaping or marker materials.

BACKGROUND OF THE INVENTION

Landscaping materials, such as wood chips, wood mulch, gravel, sand, rubber chips, and rubber mulch, are currently available in their normal natural colors, and in some cases, specifically wood chips and wood mulch, are available colored, for example, in black, brown, and red. Rubber chips are available painted for use as playground material. Gravel and sand used in landscaping applications are not commonly available in non-natural colors.

The conversion of natural wood or other plant fiber-based substrates to colored substrates is currently a rather sloppy, inefficient, expensive, and, in some cases, environmentally unfriendly process. In the case of converting natural mulch to colored mulch, or natural chips to colored chips, the process circumstances are highly inefficient. In order to color mulch or chips, a producer of such colored product typically purchases a pigment suspension of an appropriate color, which, if it is carbon to produce a black product, typically ranges from about ten pounds per gallon to about eleven pounds per gallon, and about twenty-five to fifty weight percent carbon pigment. Typically, the carbon suspension is distributed in 55-gallon drums weighing approximately 500 net pounds and containing about 150 to 250 pounds of carbon. Currently, in order to apply this concentrated pigment dispersion to the substrate to be colored, the producer dilutes it with a substantial volume of water, a 60:1 dilution in some cases, bringing the final volume from 55 gallons to as much as 3300 gallons or more. The mulch is essentially then slurried in this highly diluted pigment dispersion. This results in a water saturated product which must be allowed to dry for extended periods of time before it can be used, and still may contain excessive water, adding significantly to the shipping weight and thus the shipping costs.

Some currently available mulch colorant devices can process mulch at the rate of 80-200 cubic yards per hour, consuming about 25-70 gallons of water per minute, or about 1500-4200 gallons of water per hour. This volumetric flow rate converts to about 15 to 20 gallons of water per cubic yard of mulch treated. At a mid-range black color level using a carbon black pigment dispersion, and 200 cubic yards per hour, 3.33 cubic yards per minute, the carbon dispersion feed rate is about 0.5 to 1.5 gpm, corresponding to about 5 to 15 pounds per minute of carbon dispersion or about 1.3 to 5.3 pounds of carbon pigment per minute, where the dispersion is approximately 25 to 35 percent carbon by weight. This corresponds to about 0.4 to 1.6 pounds of carbon pigment per cubic yard of mulch.

Assuming a pigment dispersion having 30 weight percent carbon pigment, in one hour, 200 cubic yards of mulch will be colored, using 3600 gallons of water and 666 pounds of carbon dispersion (or 200 pounds of carbon pigment). Since the wet colored mulch weighs about 700 pounds per cubic yard, the total mass of mulch, wet, is approximately 140,000 pounds, including the added total weight of water of about 30,000 pounds, along with 666 pounds of carbon dispersion, or 30,700 pounds total, added weight. Depending on the substance or substances from which the mulch is made, the untreated mulch may contain anywhere from 10 weight percent to 75 weight percent moisture, from very dry pallet wood to mulch exposed to excessive rainfall. Where the moisture content of the mulch material is essentially about 60+ weight percent moisture, there is little capacity to absorb significant additional water, meaning that the coloring water solution will be mostly wasted.

If the mulch is able to absorb 10 percent moisture weight from the colored water solution, as an example, approximately 13,000 pounds of water would be absorbed and 19,000 pounds, 2278 gallons (60 percent), would be lost as overflow, runoff, or post-treatment bleeding. This is not only an inefficient use of materials, but, depending on the colorant being employed, may also be an environmental hazard.

In the case of coloring rubber chips, a pigmented polymeric composition, essentially paint, is generally used to coat the rubber chips by dip coating, i.e., submersion of the chips in the liquid composition. In this process, the resultant colored rubber chips are covered in wet paint, and therefore the unused paint needs to be separated and the coated rubber chips dried. These coating compositions are water-based so the drying process is either slow at ambient conditions or energy consumptive at elevated (dryer) conditions. The residual unused coating composition is not recoverable, and since this composition is expensive, the loss of material adds to the overall cost of production.

A process capable of more efficient water and pigment consumption, and of reduced moisture content of the colored product would benefit the overall economics and environmental consequences of these coloring processes.

SUMMARY OF THE INVENTION

According to one aspect of the present invention, a method is disclosed for treating a marker material comprising combining at least one treatment for a marker material, a foaming agent and a solvent to form a marker composition, foaming the marker composition, and applying the foamed marker composition to a marker material.

According to another aspect of the present invention, a marker composition is disclosed comprising a treatment for a marker material, a surfactant, and a solvent. The concentration of the surfactant is at least about 300 ppm actives.

According to a further aspect of the present invention, a treated marking material is disclosed comprising a marker material and a marker composition applied to the marker material. The marker composition includes a treatment for the marker material, a foaming agent, and a solvent.

BRIEF DESCRIPTION OF THE DRAWINGS

FIG. 11A is a partial cross sectional side view of the foam dispensing trommel device of FIGS. 4A-E including a UV light source.

FIG. 11B is a cross sectional end view of the foam dispensing trommel device of FIGS. 4A-E including a UV light source.

DETAILED DESCRIPTION OF THE INVENTION

Figure 1:
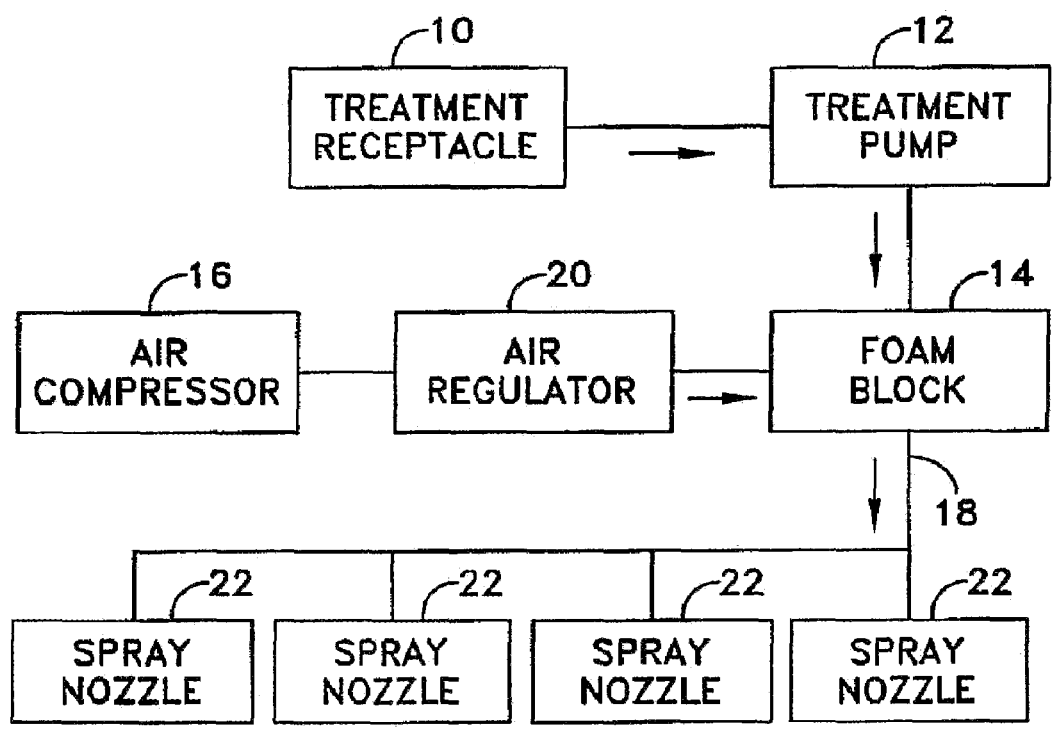
FIG. 1 is a schematic diagram of an exemplary foaming system used in one embodiment of the present invention.

This application hereby incorporates by reference the entire disclosure in U.S. patent application Ser. No. 10/405,046, filed Mar. 31, 2003 entitled "Compositions, Methods And Devices For Enhancing Landscaping Materials", U.S. provisional application Ser. No. 60/369,080, filed Apr. 1, 2002, entitled "Treatments for Enhancing Mulch Materials," U.S. provisional application Ser. No. 60/370280, filed Apr. 5, 2002, entitled "Treatments for Enhancing Mulch Materials," U.S. provisional application Ser. No. 60/376,299, filed Apr. 29, 2002, entitled "Treatments for Enhancing Mulch Materials," U.S. provisional application Ser. No. 60/377,079, filed May 1, 2002, entitled "Treatments for Enhancing Mulch Materials," U.S. provisional application Ser. No. 60/379,302, filed May 10, 2002, entitled "Treatments and Methods for Enhancing Mulch Materials," U.S. provisional application Ser. No. 60/383,228, filed May 23, 2002, entitled "Treatments and Methods for Enhancing Landscape Materials," U.S. provisional application Ser. No. 60/383,231, filed May 23, 2002, entitled "Treatments for Enhancing Mulch Materials", U.S. provisional application Ser. No. 60/394,760, filed Jul. 10, 2002, entitled "Methods and Devices for Enhancing Landscaping Materials," U.S. provisional application Ser. No. 60/423,199 filed Oct. 31, 2002, entitled "Compositions, Methods, and Devices for enhancing Landscape Materials;" and U.S. provisional application Ser. No. 60/435,590, filed Dec. 20, 2002, entitled "Compositions, Methods and Devices for Enhancing Landscaping Materials".

The present invention provides compositions, methods and machines for the treatment of landscaping materials and marker materials utilizing foam technology as a delivery medium for the colorant or other treatment. Landscaping materials, as used herein to refer to substrates which are treated with the compositions disclosed herein, is meant to include a wide variety of materials used in the landscaping (or play surface) business, including, for example, mulch, sand, gravel, rocks or stone, pavers or concrete blocks, slag, soil, leaves, fertilizer (including commercial synthetic fertilizer (NPK) and pelletized sewage sludge and/or animal waste), compost, aggregates, quartzite, lava rock, grass/turf, peat moss, and particularized rubber or other polymeric material. Mulch may be virgin or recycled materials, and may include, for example, wood chips, wood shavings or fibers (including particularized wood waste and green wood), sawdust, pine needles, bark, paper, straw, bagasse, leaves, wheat and oat hulls, rice waste product, palm tree waste, palmetto, bamboo, food or vegetable-derived mulches, polymeric materials, other botanical or agricultural waste products, and combinations thereof.

Marker materials may include a salt, for example, including sodium chloride, calcium chloride, potassium chloride or magnesium chloride, for example. The treatment, or coating, of such markers with a colorant is advantageous in clearly marking locations.

It has now been discovered that delivering treatments for landscaping materials or marker materials to such landscaping or marker materials via foam medium, preferably aqueous foam, can significantly improve the efficiency of the process of adding such treatments to the landscaping or marker materials. In particular, as shown in the examples below, it has now been shown that aqueous foam is well suited to the task of distributing pigment, for example, onto landscaping materials such as mulch and wood chips. The foam is an excellent carrier for very small particulates, such as pigment. Further, with a high performance foam making system, significant particulate loading can be achieved. And although high particulate loading in a foaming system is generally a negative with respect to foam stability and drain time, in the present applications, any reduction in foam stability and drain time does not have adverse consequences since the foam is not required to persist for extended periods of time.

Unlike the addition of small amounts of water to mulch or wood chips which will initially bind the mulch particles into a mud-like consistency making pigment distribution essentially impossible, adding similar amounts of water to mulch, as foam, will improve the flowability, with the foam medium actually performing as a lubricant. Further, since the expansion ratio (volume of foam compared to the volume of liquid from which it is formed) of certain preferred foams will be as much as 20×, the water consumption may decrease from as much as 18 gallons per cubic yard of mulch to be treated to about one gallon per cubic yard or less, depending on the initial moisture content of the raw material. This lower water level corresponds to a theoretical 1.2 percent weight increase in the product mulch without regard for any evaporative losses. In some cases, the actual moisture addition to the mulch may be undetectable using common moisture sampling techniques.

In general, foam can be produced by any method that includes adding an expansion gas to a liquid having a reduced surface tension. Generally, foam production can be either air aspirated, like fire fighting foam (or other instances of liquid under pressure containing a dissolved gas, such as employed in whipped cream or shaving cream), or pneumatic, also known as compressed air foam. Foam can also be produced by other methods, e.g., via simple agitation of a liquid. In order to produce water based pneumatic foam, compressed air is added to water with a suitably reduced surface tension. The combination is allowed to mix, thereby actually generating the desired foam. Any suitable mechanical arrangement (foaming system) can allow this combination and mixing to occur.

In order to reduce the surface tension of water or aqueous solutions, a material described as a surfactant or surface-active agent is added. Additionally, the surface tension can be further reduced by raising the temperature of the liquid. The preferred surfactants for good foaming performance are anionic, but some cationic and non-ionic materials also foam well. In general, the anionic materials are less expensive. When making foam with only water, anionic surfactants can be used at low concentrations, preferably in the range of 1000 ppm to 2000 ppm actives, with a minimum concentration of usually about 200 ppm and a maximum concentration limited only by the solubility of the surfactant being used. When additional non-foaming ingredients are added to a foaming system, for instance, pigments, polymer, dispersants, and other water insoluble materials, in general, the concentration of surfactant may need to be increased and the type of surfactant altered to support the extra materials in the composition.

Another procedure that can be used to reduce the surface tension is increasing the fluid temperature. The surface tension of water or an aqueous solution decreases as the temperature increases, thereby providing another way to improve or modify foaming performance.

The expansion gas for foam making is conventionally compressed air but almost any compressed gas could be used—nitrogen, argon, helium, hydrogen, oxygen, etc. There are water soluble (under pressure) gases that could be used as both the expansion gas and the surface tension reducing agent, as these materials do reduce the surface tension of water when dissolved. Examples include, but are not limited to, carbon dioxide, nitrous oxide, and many low molecular weight hydrocarbons. The dissolved gas technique is used for foam making in many commercial applications, such as carbon dioxide in beverages, nitrous oxide as the propellant (expansion gas) for whipped cream, and isobutane as the expansion gas for shaving cream.

In order to achieve the proper amount and coverage of treatment on a landscaping or marker material, such as mulch, the rate of transfer of the treatment, e.g., pigment, onto the material or substrate is preferably controlled. The use of a foam medium to control this rate of transfer is highly effective. Where excellent mixing of the landscaping or marker material and treatment occurs, such as in the case where machines having screw conveyors or augers are employed, enhanced foaming (i.e., longer drain time) is needed to slow the transfer rate (or length of time it takes for the treatment to contact the substrate) so that all of the material is properly coated. Conversely, where less efficient mixing occurs, as would be the case where mixing occurs in currently available trommel-type devices, less foaming (or reduced drain time) is necessary. Thus, the foaming performance may be modified depending on the apparatus being employed to apply the treatment to the landscaping or marker material. Under current methods of coloring mulch, the problem of transfer of pigment evenly onto mulch is resolved via dilution of the pigment in copious amounts of water. However, water dilution lowers the concentration gradient of the pigment in the solution. Use of a foam medium, on the other hand, allows maintenance of a high pigment concentration gradient in the solution to be applied to the mulch, and thus results in the benefits of significantly lower water consumption and avoidance of pigment loss.

A landscaping or marker composition according to one embodiment of the present invention will now be described. The landscaping or marker composition comprises a treatment for landscaping or marker materials, a foaming agent and a solvent. The treatment for landscaping or marker materials may include one or more of the following: colorants, such as dyes or pigments; an oil or oil-like material (water soluble, water insoluble, or a polymeric composition) that enhances the appearance, fragrance, longevity, and/or insect repellency of the landscaping or marker material; insecticides (e.g., DEET); fungicides; herbicides; fertilizers; nutrients; dust control agents; odor control agents; sunscreening agents; UV reactive curing agents, coatings, hardeners, binders, paints or pigments (e.g., UV cured monomer resins, especially for application to rubber or sand, including PMPTA); seed; erosion control materials (such as, for example, naturally derived vegetable binders for soil stability); plant aging or plant decomposition accelerating materials; luminescent, fluorescent, or phosphorescent pigments or other reflective compounds or minerals; binding agents (both polymeric and non-polymeric for adhering the landscaping or marker materials together); wetting agents; polymeric materials (such as acrylic polymers) for anti-weathering and appearance enhancing; polyethylene polymers for providing a gloss; concrete scalers; water repellants or preservatives (especially for application to pavers or concrete blocks); and wood preservatives, protectors or sealants. The term foaming agent is intended to cover any means of lowering the surface tension of a liquid, including any chemical material or combination of chemical materials (liquid, solid or gas) capable of reducing the surface tension of a solvent liquid, preferably water, and capable of producing foam when suitably mixed with an expansion gas, which is normally air but can be any other gas, either soluble or insoluble in the solvent system being used. Foaming agent may also include an elevated temperature.

In one preferred embodiment, the treatment for landscaping or marker materials comprises a colorant. The colorant may be, for example, a dye or a pigment (pigments may also include lakes, a type of insoluble pigment prepared by extending a water soluble dye on an insoluble substrate). The dye may be dry, in liquid form, or dissolved in a liquid carrier. The pigment may be dry, suspended in a liquid carrier or carried on a substrate such as polymer or glass beads. Further, the pigments may be in powder, pellet or granule form.

The dyes and pigments may be natural or synthetic. Preferred pigments include various iron oxides, carbon, and titanium dioxide. Other colorants that may be used include tannins, vegetable tints, other natural colorants derived from plants, synthetic dyes, food colorings, and the like. Preferably, the colorants are non-toxic. A colorant may be used individually or blended with another colorant to obtain any desired color. Where the treatment for landscaping or marker materials comprises a pigment (e.g., iron oxide or carbon), the landscaping or marker composition will preferably further include a liquid carrier or solvent, usually water, which will preferably include a suspending, dispersing or stabilizing chemical system, often polymeric in composition. Where the colorant is water soluble, the landscaping or marker composition will be modified to maintain foamability and formulation stability.

Where the landscaping materials to be colored are comprised of rubber, e.g., rubber chips for playground use, the treatment for the landscaping material preferably comprises a pigment and a binder. Preferably the binder is an acrylic polymer system, however, other polymer systems may be used, such as styrene/butadiene, for example.

Where the landscaping or marker materials to be colored comprise an inorganic or mineral material such as sand, rocks or gravel, the treatment for the landscaping or marker material preferably comprises a pigment and a binder. Preferably the binder is a silicate binder, although other binders could be used such as silicone or certain clays, e.g., kaolin or bentonite (See Example Sixteen which includes the use of gelled dispersion containing bentonite clay), or a polymer binder system such as vinyl acetate, acrylics, styrene acrylics, co-polymer vinyl, polyacrylates, urethanes, methylcellulose, liginsulphonate, polyvinyl alcohol, polyethylene wax emulsions, or those described above with respect to the rubber chips. This allows the landscaping or marker material, or substrate, to be effectively painted. In the silicate binder system, the pigment is preferably added to a sodium or potassium silicate formulation suitably modified (by adding a sufficient amount of surfactant) to allow foaming. The silicate system will become insolubilized when contacted by the mineral substrate thereby bonding the pigment to the substrate. Modifications of the formulation can allow for different physical properties of the final coated/bonded substrate.

In another preferred embodiment, the treatment for landscaping or marker materials of the landscaping or marker composition comprises at least one oil (or oil-like) material that will enhance the appearance, fragrance and/or insect or animal repellency of the landscaping or marker material. The oil material may include one or more natural oils (plant derived or animal derived oils or their component fractions), one or more synthetic oils (including mineral oils and silicones), esters, chemical derivatives of any of the foregoing, or a combination thereof. The oil materials may additionally provide a benefit of dust suppression. Additionally the oils may be tinted.

The plant-derived natural oils may be, for example, neem oil, karanja oil, citronella oil, citrus oils, cinnamon oil (bark and leaf), eucalyptus oil, cedar oil, lemongrass oil, linseed oil, soybean oil, licorice oil, clove oil, mint oil, sweet birch oil, spearmint oil, peppermint oil, anise oil, bergamot oil, canola oil, castor oil, cedarwood oil, jojoba oil, lavandin oil, mustard seed oil, coconut oil, eue oil, tulsi oil, almond oil, cottonseed oil, corn oil, geranium oil, sesame oil, thyme oil, tung oil, rosemary oil, basil oil, fennel oil, ginger oil, grapefruit oil, mandarin oil, orange oil, pepper oil, rose oil, tangerine oil, tea tree oil, tea seed oil, balsam oil, bay oil, capsicum oil, caraway oil, cardamom oil, cassia oil, celery oil, cognac oil, dillweed oil, guaiacwood oil, juniper berry oil, lime oil, origanum oil, parsley oil, pimento leaf oil, ajowan oil, apricot oil, betel leaf oil, bawchi oil, chilly seed oil, clary sage oil, cubeb oil, curry leaf oil, frankincense oil, ginger grass oil, gulthria oil, heeng oil, jamrosa oil, kulanjan oil, kalaunji oil, linaloe berry oil, ban tulasi oil, bursera oil, cumin seed oil, cyperiol oil, gereniol oil, grape seed oil, hinoki oil, juniper leaf oil, laurel berry oil, lichen oil, mace oil, mango ginger oil, mentha pipereta oil, paparika oil, vetivert oil, wheat germ oil, watermelon oil, macassar oil, mentha citreta oil, musk melon oil, nar kachur oil, palmarosa oil, patchouli oil, perilla seed oil, pomegranite oil, pumpkin oil, tomar seed oil, cananga oil, herbal puja oil, avocado oil, safflower oil, abies alba needle oil, ambrette seed oil, amyris oil angelica root oil, artemisia oil, estragon oil, fir needle oil, galangal oil, galbanum oil, olibanum oil, palmarosa oil, patchouli oil, birch oil, cajeput oil, calamus oil, cananga oil, carrot oil, cistus oil, citron oil, coriander oil, costus oil, cypress oil, davana oil, dill wood oil, dwarf pine needle oil, elemi oil, guajac oil, hop oil, hyssop oil, chamomile, jasmine oil, larch oil, laurel leaf oil, lavender oil, lemon balm oil, limba pine oil, litsea cubeba oil, lovage oil, manuca oil, marjoran oil, milfoil oil, myrrh oil, myrtle oil, neroli oil, niauli oil, petit grain oil, rockrose oil, rosewood oil, sage oil, rue oil, sassafras oil, spik oil, tagetes oil, thuja oil, valerian oil, verbena oil, vervain oil, vetiver oil, wintergreen oil, wormwood oil, ylang ylang oil, olive oil, evening primrose oil, hazelnut oil, grape core oil, peach core oil, walnut oil, sunflower oil, sandalwood oil, tumeric oil, nutmeg oil, soy oil, vegetable oils, menthol oil, eucalyptol, camphor oil, cedar leaf oil, pine oil, red pine oil, or combinations thereof.

Potentially employable animal derived natural oils may include, for example, tallow oil or fish derived oil (e.g., cod liver oil or shark oil) and their component fractions.

One or more synthetic oils, including mineral oils, silicones and fatty acid esters, and their chemical derivatives, preferably non-toxic, may be used in lieu of or in combination with one or more of the natural oils. Examples of mineral oils include, for example, petroleum derived oils. The fatty acid esters, such as alkyl stearate, are formed by the combination of a medium to long chain alcohol with a suitable long chain fatty acid, which may be branched or unbranched. Use of synthetic oils may lower the cost of the treatment for landscaping or marker materials while still maintaining a desired appearance and/or aroma benefit.

In addition to natural oils, which may impart a fragrance to the landscaping or marker material, synthetic fragrance-imparting oils may be included in the treatment for landscaping or marker materials including, for example, acetophenone, C10-C20 aldehydes, allyl cyclohexyl propionate, ambroxan, amyl cinnamic aldehyde, amyl salicylate, anisaldehyde, aurantiol, benzaldehyde, benzyl acetate, benzyl salicylate, brahmanol, calone, cashmeran, cedramber, cedryl acetate, cinnamic alcohol, citral, citronellal, citronellol, citronellyl acetate, coumarin, cyclamen aldehyde, cyclopentadecanolide, damascone beta, dihydromyrcenol, dimethyl benzyl carbinyl acetate, diphenyl oxide, ethyl phenylacetate, ethyl vanillin, eugenol, evemyl, frambinone, galaxolide gamma-decalactone, geraniol, geranyl acetate, geranyl formate, geranyl nitrile, geranyl acetate, hedione, helional, heliotropin, cis-3-hexenyl acetate, cis-3-hexenyl salicylate, hexyl cinnamic aldehyde, hexyl salicylate, hivertal, hydroxycitronellal, indol, ionone alpha, isobornyl acetate, isobutyl quinoline, isoeugenol, iso E super, isogalbanate, cis-jasmone, lilial, linalool, linalyl acetate, lyral, maltol, methyl anthranilate, methyl benzoate, methyl cinnamate, methyl chavicol, methyl ionone gamma, methyl napthyl ketone, methyl octine carbonate, methyl salicylate, musk ketone, musk T, paracresyl acetate, phenoxyethyl isobutyrate, phenylacetaldehyde, phenylacetic acid, phenylacetaldehyde dimethyl acetal, phenylethyl acetate, phenylethyl alcohol, phenylethyl dimethyl carbinol, phenylethyl phenylacetate, phenylpropyl alcohol, rosalva, rosatol, rose oxide, sandela, styrallyl acetate, terpineol, tonalid, vanillin, vertacetal, vertofix, vetiveryl acetate, vertenex (PTBCHA), and combinations thereof.

In one preferred embodiment, the treatment for landscaping or marker materials comprises an oil material that will provide a pleasant scent to the landscaping or marker materials. A single oil or a variety of combinations of oils may be employed to arrive at a desired scent. Preferably, the treatment includes an effective amount of individual oils or combinations of oils sufficient to enhance the aroma of the mulch or other landscaping or marker material being treated. The oils used in the treatment may release a scent for several months. Preferably, an amount of aroma-imparting oil or combination of oils effective to maintain a release of the desired scent for at least one month is employed. The oil materials may be supported on a substrate facilitating a timed-release or controlled-release of the oil material, such as polymer or glass beads, for example. Preferably, the beads are of sufficiently small size (approaching the size of colorant pigments) that they may be adequately distributed by foam. In an exemplary embodiment, a concentrated solution containing up to 40 percent by weight of an oil material and 60 percent by weight of a combination of surfactant and water, the combination of water and surfactant containing as much as 60 percent actives, may be employed. Depending upon the amount of treatment desired on the landscaping or marker material (or desired effect of the treatment) and the throughput of the landscaping or marker materials being treated (e.g., the flow rate of the landscaping or marker materials through a landscaping or marker material processing machine, such as a trommel device), the concentrated solution may be diluted down to a level that still facilitates foaming of the diluted solution onto the landscaping or marker materials.

Synthetic and/or natural oils may be employed which have a wide range of different scents, including, for example, apple, cinnamon, pine, strawberry, blueberry, and citrus scents. In one embodiment, the natural and/or synthetic oils will enhance the natural aroma or the perceived natural aroma of various types of wood, and may include, for example, such oils as vetivert, sandalwood oil, cedar oil, patchouli, rosewood oil, pine oil, cypress oil, birch oil, agar, wormwood oil, oakwood oil, vanillin, isobornyl acetate, fir balsam oil, and combinations thereof.

Plant extracts, including, for example, root extracts, herbal extracts, and bean extracts, such as vanilla extract, may further be included in the treatment for landscaping or marker materials in order to provide a desired aroma. Plant extracts may also be effective in repelling or killing insects. One plant extract which may be included in the treatment for landscaping or marker materials is limonene, an extract from citrus plants, which is not only highly effective in repelling and killing insects, but also is environmentally safe.

Although the treatment for landscaping or marker materials may include a single oil, preferably a combination of oils is employed in an effective amount to provide each of an appearance enhancer, an insect repellant and a fragrance. One oil may provide one or more of these characteristics. Neem oil, citronella oil, karanga oil and nepetalactone oil are examples of some preferred oils, as they are especially effective oils in repelling insects.

In the case of water insoluble treatments for landscaping or marker materials, such as the above described oil materials, the treatment may be emulsified or carried by a substrate such as polymer or glass beads. Further, the oils may be solubilized in a solvent, such as water, via a solubilizer. Addition of polymer or glass bead-supported water insoluble treatments may alter the pigment loading of the foam where the treatment also comprises a colorant pigment, as both the pigment and support medium are competing. One alternative is to use water soluble colorant dyes instead of pigments in the landscaping or marker composition. U.S. Pat. No. 4,561,905 to Kittle and U.S. Pat. No. 4,780,143 to Roe, which are hereby incorporated by reference, describe potential methods for applying insoluble oils to a substrate via a foaming medium.

The treatment for landscaping or marker materials may additionally or alternatively comprise one or more nitrogen compositions to act as a fertilizer. Such nitrogen compositions may include ammonia, ammonium hydroxide, urea, ammonium nitrate, nitrogen solutions (urea and ammonium nitrate and water) mono-, di- and poly-ammonium phosphate, and ammonium sulfate. Nitrogen compositions generally available in dry or gaseous form, such as ammonia, urea, ammonium nitrate and ammonium sulfate, may be dissolved in the solvent of the landscaping or marker composition.

The treatment for landscaping or marker materials may additionally or alternatively comprise micro or macro nutrients including, for example, potassium, iron, boron, calcium, copper, magnesium, manganese, molybdenum, sulfur and zinc. A landscaping or marker composition comprising such nutrients as a landscaping treatment is especially beneficial where the landscaping material being treated is soil. The landscaping composition including the nutrients may be foamed onto the soil while the soil is being screened (e.g., in a trommel device) or onto soil in place.

The treatment for landscaping materials may additionally or alternatively comprise a plant aging or decomposition accelerating material, such as bacteria, fungi or enzymes. An example of one specific treatment material that may be used includes BNB-931™, a bioremediation material, manufactured by Westbridge Agricultural Products of Vista, Calif. These materials are especially beneficial for wood mulches or compost containing leaves which otherwise might require up to a year or more to age. Foamed landscaping compositions including these plant aging or decomposition accelerating materials are advantageously used in conjunction with leaf or windrow turners or trommel devices to reduce the amount of turning and aging time typically required.

The treatment for landscaping or marker materials may additionally or alternatively comprise a luminescent, phosphorescent or fluorescent pigment or other reflective material for providing the landscaping or marker material with a glittering, shimmering or light-reflecting appearance. Examples of such pigments or other materials include mica, nacreous pigments, aluminum flakes, glass flakes, paint flakes or chips, glass beads and molybdenum disulfide. The mica (such as pearl mica) or other materials may also include layers of titanium oxide, iron oxides, silver, gold, copper, palladium, nickel and cobalt, metal alloys, or combinations thereof, which may provide a colored appearance to the reflective pigment. Examples of such pigments and the methods of producing these pigments are disclosed in U.S. Pat. No. 4,954,175 to Ito, et al., which is incorporated by reference herein. Where the treatment comprises one or more of the above light-reflective materials, preferably the landscaping or marker composition further comprises a binder for enhancing adhesion of such substances to the landscaping or marker materials.

While the above reflective materials may be the only landscaping or marker treatment in the landscaping or marker composition, preferably a landscaping or marker composition including one or more of the above reflective materials also includes a colorant, such as a pigment. Where the landscaping or marker composition comprises both a reflective material and a colorant, the colorant and reflective material may be added in sequence, e.g., the reflective material is added in a separate step after the landscaping or marker material has been treated with a colorant. Alternatively, in some cases, depending on the reflective material and the type of colorant employed, both treatments may be added in a single contacting event (e.g., in a single pass through a landscaping or marker material processing machine), with the colorant being added initially and the reflective treatment added afterward, or both treatments added simultaneously. For example, there may be two different nozzle locations in a single landscaping or marker material processing machine, whereby the first nozzle or set of nozzles applies a colorant material and the second nozzle or set of nozzles (or another means of spraying) applies the reflective material, the second nozzle or set of nozzles being located at a position whereby the reflective material is applied after the landscaping or marker material has already been coated with the colorant. The lack of moisture addition achieved via foam application allows this rapid sequence to be successful in certain cases.

The treatment for landscaping or marker materials may additionally or alternatively comprise odor control agents. Such odor control agents may include commercially available materials such as SUPPRESS® manufactured by Westbridge Agricultural Products of Vista, Calif.

The treatment for landscaping or marker materials may additionally or alternatively comprise polyethylene polymers for providing a gloss to the mulch or other landscaping or marker material. To employ polyethylene polymers for foaming onto landscaping or marker materials, these polymers should first be converted into a water based dispersion. Commercially available polyethylene polymer dispersions or emulsions may be used. Another material which may be employed as a treatment material to provide a gloss is a vinylacetate-ethylene latex (preferably with a glass transition temperature of around 5-10° C.).

The above treatment materials each may be advantageously foamed onto landscaping or marker materials. Insoluble solid materials, such as paint flakes, glass beads, metals, etc., may be foamed according to the procedure set forth herein with respect to pigments. The amount of these insoluble materials will be dependent upon the effect desired to be achieved. Insoluble liquids, such as oils, may be emulsified or carried on a substrate such as polymer beads. As with insoluble solid materials, the amount of treatment material to be used will be dependent upon the desire effect to be achieved by the treatment material.

As stated above, the foaming agent may comprise, for example, any chemical material or combination of chemical materials capable of reducing the surface tension of a solvent liquid, generally water, and capable of producing foam when suitably mixed with an expansion gas. Preferred foaming agents include one or more surfactants or surface-active agents. Any of anionic, cationic, nonionic or amphoteric surfactants may be used, but the most preferred surfactant type is anionic. In particular, where the landscaping material comprises wood mulch or wood chips, preferred surfactants include linear sodium alkyl benzene sulfonate, sodium α-olefin sulfonate, sodium di-alkylsulfosuccinates, (preferably sodium dioctylsulfosuccinnate), and a wide range of alkyl ether sulfates and sulfonates, including sodium, potassium or ammonium cations. Ammonium is the preferred cation, since, unlike sodium and potassium which are permanent bases, ammonium is a fugitive base. Specific examples may include Stepan Bio-Terge AS-40, Stepan Bio-Soft D-40, Stepan Steposol CA-207, Stepan Steol CS-460 and CA-460, and Cedepal FA-406, manufactured by Stepan Company, Northfield, Ill., as well as surfactants manufactured by Witco, of Greenwich, Conn., like Witcolate 1247H. Each of these materials is generally supplied as an aqueous solution with actives levels ranging from 35-75 percent by weight. Another foaming agent which may be employed comprises a dissolvable gas.

The landscaping or marker composition further comprises a solvent or carrier liquid. (The term "solvent" as used throughout, is meant to encompass the term "carrier liquid", as it is evident that certain treatments, e.g., some colorant pigments, are not soluble in the preferred solvent, which is water.) The solvent may serve as a liquid carrier for both the foaming agent and the treatment for the landscaping or marker materials. Preferably the solvent is water.

The landscaping or marker composition may further comprise a viscosity enhancer or suspension agent, such as bentonite clay, attipuligate clay, modified starch, cellulose, such as hydroxyethyl cellulose, and associative thickeners, or a combination thereof, as well as a wide variety of other commercially available materials. This may be beneficial where the landscaping or marker treatment comprises a colorant pigment, as increasing the viscosity of the landscaping or marker composition will aid in keeping the pigment dispersed in the composition, preventing settling and allowing an increased amount of pigment in the landscaping or marker composition. In some formulations the desired composition may actually be a gel as that consistency may provide the most stability. Bentonite clay is a preferred suspension agent used to suspend colorant pigments. Preferably, in a concentrated landscaping or marker composition having a red iron oxide pigment concentration of about 65 percent, the landscaping or marker composition comprises approximately 2 percent bentonite and 1 percent cellulose.

The landscaping or marker composition may also include one or more binders to aid in the adhesion of the treatment to the landscaping or marker material. Such binders may include, for example, any of a wide variety of commercial materials which may be acrylic, vinyl acetate or other polymer systems.

In one preferred embodiment of the landscaping or marker composition, especially where the landscaping composition is to be foamed and applied to wood landscaping materials such as mulch or wood chips, the treatment for landscaping or marker materials comprises a colored pigment, the foaming agent comprises a surfactant, and the solvent comprises water. Preferably, the landscaping or marker composition further comprises a dispersion or stabilizing agent. Concentrated pigment dispersions containing pigment, water and stabilizing agents are commercially available and may be used in the landscaping or marker composition. Examples of commercially available pigment dispersions include many color and formulation variations available from T. H. Glennon of Salisbury, Mass., Tiarco Chemical of Dalton, Ga., Reitech Chemical, of Reading, Pa., Premier Colors, of Union, S.C., Alabama Pigments, of Birmingham, Ala., and Engelhard Industries, of Iselin, N.J.

In a preferred embodiment, the pigment is carbon black or iron oxide and the surfactant is an alkyl ether sulfate. The pigment concentration in the landscaping or marker composition, which is actually foamed, may range from a few parts per million to 70 percent by weight, and the surfactant concentration may range from 200 ppm actives to 30,000 ppm actives or more. Preferably, the pigment concentration is between 1 weight percent and 20 weight percent and the surfactant concentration is between 2000 and 10,000 ppm actives. More preferably, where the pigment is carbon black or a conventional metal oxide, such as an iron oxide, the pigment concentration is approximately 5-20 percent by weight and the surfactant concentration is approximately 5000-8000 ppm actives (or 0.5 to 0.8 weight percent actives). The surfactant concentration can be minimized with low pigment levels, pure water and warm temperatures. As the pigment level increases, the water quality deteriorates, and the temperature drops, the surfactant level may increase. Thus, while a surfactant concentration of only 300-500 ppm actives may be sufficient in some circumstances, very difficult circumstances may require up to 30,000 ppm actives.

The elements of the landscaping or marker composition may first be prepared as a concentrated solution or dispersion which may be subsequently diluted prior to foaming. Where the concentrated solution comprises the colorant pigment carbon black, preferably the concentrated solution comprises 20 to 50 weight percent carbon, 5 to 7 weight percent surfactant actives and the balance made up by water (which includes approximately 2 weight percent stabilizers). Other pigments can allow higher solids levels and the solids levels can be increased by increasing the viscosity while still maintaining the overall stability of the dispersion. Compositional alternatives for the concentrated dispersion are numerous and will be dependent upon such factors as pigment type, combination of pigments, water quality issues, and freeze protection circumstances. A concentration range for the concentrated landscaping or marker composition comprising pigments, in general, may range from 10-70 weight percent pigment, 1-25 weight percent actives for surfactant, with water and stabilizers constituting the balance. Preferably, the concentrated composition, prior to dilution and under average conditions, comprises 20-50 weight percent pigment, 5-10 weight percent actives for surfactant, with water and stabilizers constituting the balance. It is not necessary that the pigment dispersion or concentrated composition be completely stable with respect to pigment settling as such settling may be managed by stirring. It is also not necessary that the pigment dispersion be diluted prior to foaming onto a landscaping or marker material.

The inventors of the present invention have discovered that the moisture content of the mulch material being colored can be an important variable in the effectiveness of the foaming process. Mulch having a moisture content of at least approximately 40 weight percent, for example, green wood and most fresh tree mulch from trees in temperate areas, can effectively be colored with a fairly concentrated landscaping solution, for instance, 20 weight percent pigment with approximately 1500 to 7500 ppm surfactant actives. However, where drier materials are used having a moisture content below 40 weight percent, such as is the case where pallets are recycled into mulch or where the mulch has been exposed to the sun for extended periods of time, it is often advantageous to raise the moisture content of the mulch either before treating with the landscaping composition or during treatment with the landscaping composition to raise the moisture content to approximately 40 weight percent. In these situations, the mulch material can either be hydrated before the foaming process, the landscaping composition may itself be diluted to increase the moisture content of the mulch, or additional water may be added during the foaming process to correct for the moisture deficiency. In addition to the moisture variable, there are several other variables which can have an effect on the coloring or treatment process, and also on the moisture variable. These include, but are not limited to, the type of material, initial color, porosity, surface texture, and size distribution.

In another preferred embodiment of the landscaping composition, especially where the landscaping composition is to be foamed and applied to rubber materials such as rubber chips for playground surfaces and rubber mulching chips, the landscaping composition comprises a treatment for landscaping materials, a foaming agent, a solvent and a binder. In one preferred embodiment, the treatment for landscaping materials comprises a colorant pigment, the foaming agent comprises a surfactant, the solvent comprises water, and the binder comprises an acrylic polymer. More preferably, the pigment concentration ranges from 1-30 weight percent, the surfactant concentration ranges from 2000-50,000 ppm actives, and the binder concentration ranges from 10-50 weight percent actives. Preferably the surfactant is Stepan CA207 or Witcolate 1247H. Unlike the preferred concentrated colorant composition used for mulch and other wood products, the colorant composition for the rubber chips is preferably not diluted, but rather foamed directly. An emulsion polymer system such as that described in U.S. Pat. No. 4,990,373 to Kittle, which is incorporated herein by reference, may be employed.

According to another aspect of the present invention, a method is disclosed for treating a landscaping or marker material comprising the steps of combining at least one treatment for a landscaping or marker material (also referred to herein as a "treatment material"), a foaming agent and solvent to form a landscaping or marker composition, foaming the landscaping or marker composition to form a foamed landscaping or marker composition and applying the foamed landscaping or marker composition to a landscaping or marker material. The step of combining the elements of the landscaping or marker composition may occur before or simultaneously with the step of foaming the landscaping or marker composition. The step of foaming a landscaping or marker composition to form a foamed landscaping or marker composition and applying the foamed landscaping or marker composition to a landscaping or marker material may be performed any number of times to the same landscaping or marker material to achieve a desired effect. For example, the treatment for the landscaping or marker material in the first series of steps may be a colorant pigment, and treatment for the same landscaping or marker material in the second series of steps may be luminescent, phosphorescent or fluorescent material applied to add a highlight or shimmering effect.

The step of foaming a landscaping or marker treatment may be performed by, for example, a foaming system. Foaming system is intended to cover any device or devices capable of generating foam, wherein the device, such as a mechanical device, facilitates the formation of foam. Foaming system may include, for example, (i) a means for rapidly stirring, agitating or aerating a liquid, thus creating or enhancing foam (such a foaming system is especially useful where a dissolved gas is employed as the foaming agent), including, for example, stirrers, shakers, agitators, sonifiers, and ultrasonic agitators, (ii) a means for adding a compressed gas to a foamable liquid, e.g., a liquid having a foaming agent, such as a surfactant or surface-active agent, and (iii) an air aspirating system comprising a means for mixing ambient air with a foamable liquid. The foamable liquid may include one or more elements of the above described landscaping or marker composition. Examples of some preferred foaming systems are described below. Where the foaming system comprises a means for adding a compressed gas to the foamable liquid, preferably the compressed gas is air. Generally the compressed gas is insoluble in the liquid, but may be soluble (e.g., carbon dioxide, nitrous oxide and hydrocarbons). The soluble expansion gas systems would operate at a pressure above atmospheric.

In one embodiment, the step of combining the treatment for a landscaping or marker material, a foaming agent and a solvent to form a landscaping or marker composition comprises combining these elements to form a concentrated landscaping or marker composition and diluting the concentrated landscape composition with a solvent to form a pre-foam (or ready-to-be-foamed) landscaping or marker composition. In another embodiment, a solvent and foaming agent are combined separately from the treatment material and subsequently combined with the treatment material prior to, or simultaneously with, the foaming step. This embodiment allows the use of a single foaming agent/solvent liquid to be used in conjunction with a variety of treatment materials, e.g., different colorants. The combining and foaming steps may occur in various general ways, for example, (1) Preparing a landscaping or marker composition concentrate including, a solvent, a foaming agent (preferably a surfactant) and treatment material (e.g., colored pigment), prediluting this combined composition to produce a volume of diluted to-be-foamed (or pre-foam) liquid sufficient for effective treatment of a landscaping or marker material, and employing a foaming system to either (i) add compressed gas to produce a foamed landscaping or marker composition (See FIG. 1, for example), or (ii) create a foamed landscaping or marker composition via air aspiration (See FIG. 3A and 3B, for example).

Figure 2:
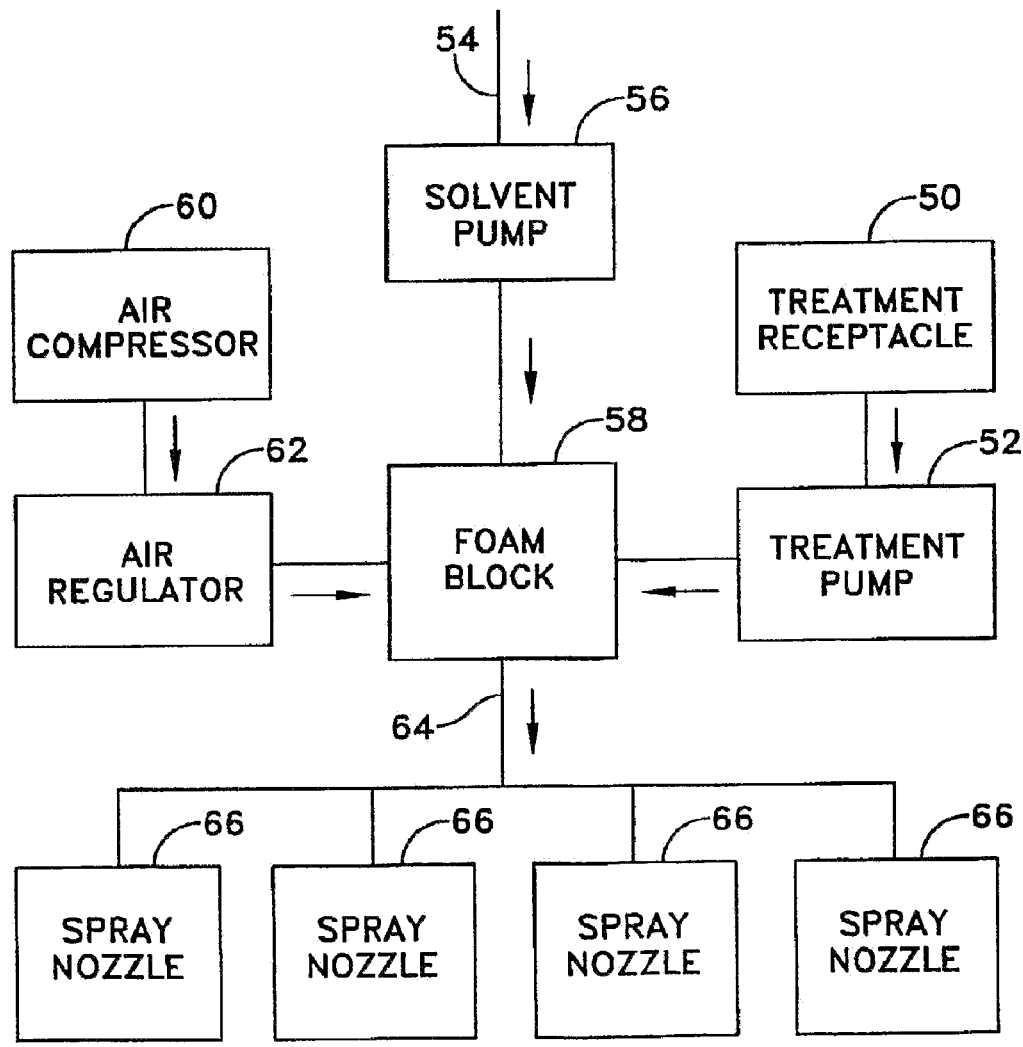
FIG. 2 is a schematic diagram of an alternative foaming system used in another embodiment of the present invention.
Figure 3A:
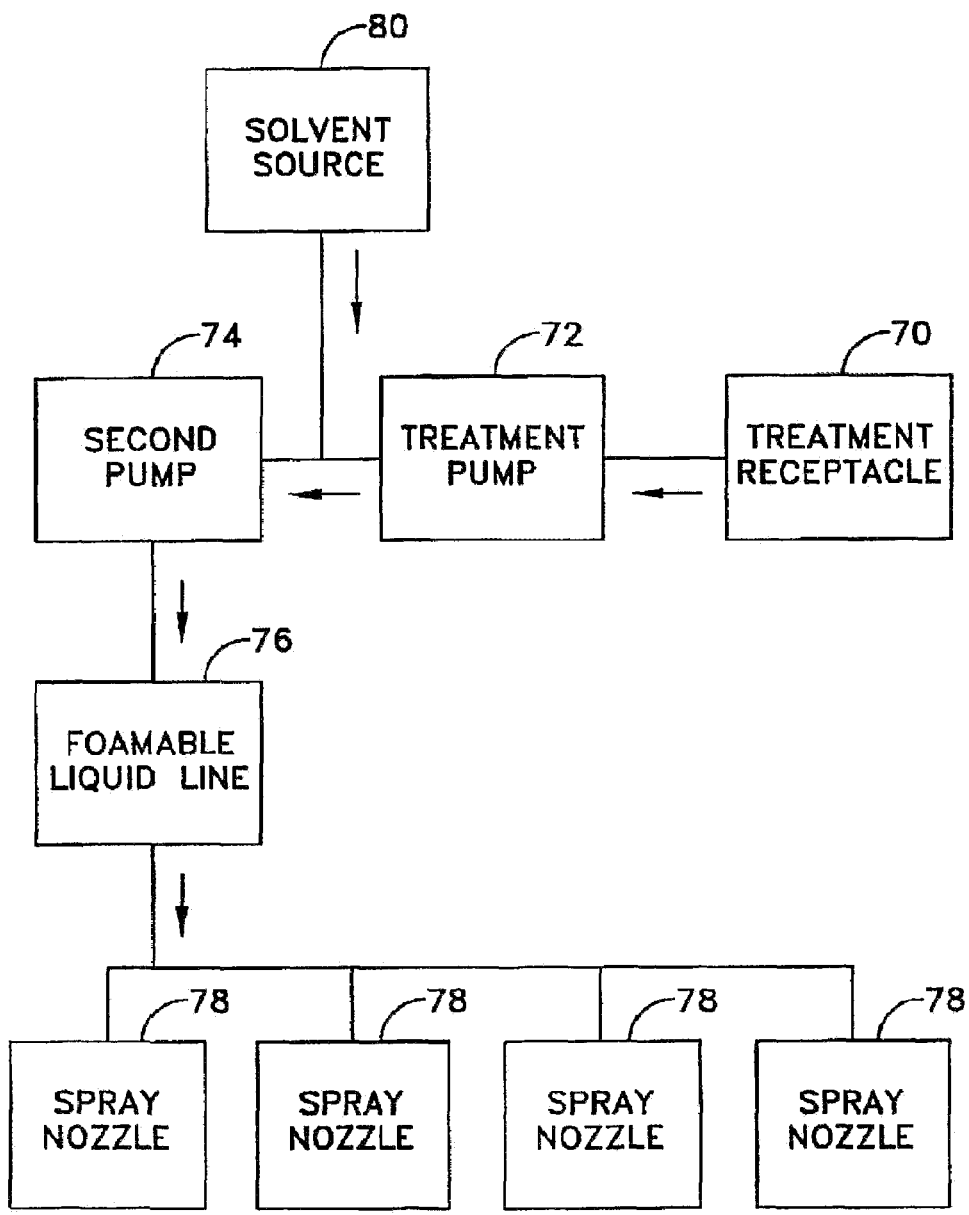
FIG. 3A is a schematic diagram of a third foaming system used in a different embodiment of the present invention.
Figure 3B:
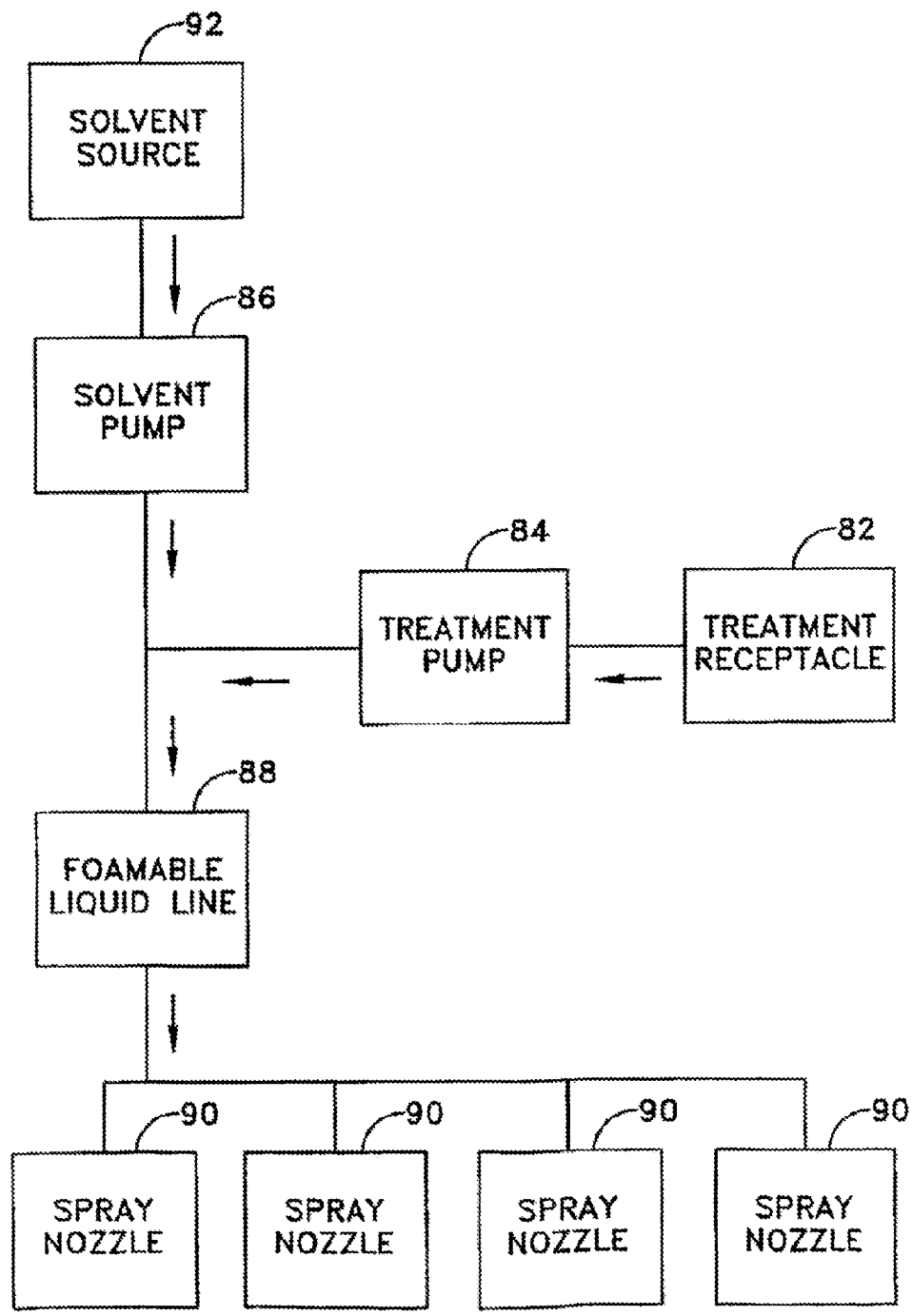
FIG. 3B is a schematic diagram of a fourth foaming system used in another embodiment of the present invention.

(2) Preparing a landscaping or marker composition concentrate including a solvent, a foaming agent (preferably surfactant), and a treatment material (e.g., pigment), prediluting this composition in-line by aspirating or pumping the concentrate into a flowing water line to produce a composition sufficient for effective treatment of a landscaping or marker material, as above, only dynamically, and employing a foaming system to either (i) add compressed gas to produce a foamed landscaping or marker composition (See FIG. 2, for example) or (ii) create a foamed landscaping or marker composition via air aspiration (See FIGS. 3A and 3B, for example).

(3) Preparing a landscaping or marker composition using separate containers, one containing a treatment material (e.g., pigment) and one containing a foaming agent (preferably surfactant), and prediluting each with a desired amount of common solvent, bringing the contents of these separate containers together into a single line, thereby producing the same to-be-foamed liquid as above, and employing a foaming system to either (i) add compressed air to produce a foamed landscaping or marker composition, or (ii) create a foamed landscaping or marker composition via air aspiration (See FIGS. 3A and 3B, for example). This embodiment allows the use of a single foaming agent/solvent liquid to be used in conjunction with a variety of treatment materials, e.g., different colorants.

(4) Preparing a landscaping or marker composition using separate containers of treatment material (e.g., pigment) and foaming agent (preferably surfactant), and aspirating or pumping each in-line into a flowing water line to produce a composition sufficient for effective treatment of a landscaping or marker material and employing a foaming system to either (i) add compressed gas to produce foam, or (ii) create a foamed landscaping or marker composition via air aspiration. This embodiment also allows the use of a single foaming agent/solvent liquid to be used in conjunction with a variety of treatment materials, e.g., different colorants.

In one preferred embodiment, the treatment for landscaping or marker materials comprises a colorant pigment, such as carbon black or an iron oxide, the foaming agent comprises a surfactant, preferably alkyl ether sulfate, and the solvent comprises water.

Several available foaming systems are suitable for foaming the landscaping or marker composition. A schematic of one acceptable foaming system is shown in FIG. 1. The foaming system 1 of FIG. 1 comprises at least one receptacle 10 containing one or more elements of landscaping or marker composition in liquid form, a treatment pump 12, a foam block 14 for combining a compressed gas with the pre-foam landscaping or marker composition, an air compressor 16 which supplies the compressed gas stream, and a foam discharge line or hose 18. The foam block 14 is fluidly coupled to the treatment pump 12, the air compressor 16 and the foam discharge line 18, and the treatment pump 12 is fluidly coupled to the at least one receptacle 10. The treatment pump 12, which is preferably a heavy duty pump capable of withstanding delivery of abrasive materials, delivers the contents of the at least one receptacle 10 to the foam block 14. The foam block 14 combines the pre-foam composition with compressed air from the air compressor 16 to produce a foamed landscaping or marker composition which is discharged through foam discharge line 18. Foam block 14 may be of the kind described in U.S. Pat. No. 4,474,680 to Kroll. The foaming system may also include at least one nozzle or a manifold having a plurality of nozzles 22 which is attached to the foam discharge line. Further, foaming system 1 may include an adjustable air regulator 20 for adjusting the foam drain time.

In foaming system 1, for example, receptacle 10 may contain all of the elements of the landscaping or marker composition (i.e., the treatment material, the solvent and the foaming agent) prediluted to the desired amount effective for treating the landscaping or marker material, or receptacle 10 may contain a concentrated landscaping or marker composition, and foaming system 1 may further include a separate water line which is coupled to a water supply (which may be a continuous water supply or water tank, for example). There may also be a plurality of receptacles 10 connected to pump 12 having separate valves and/or flow meters to allow for the exchange of different landscaping or marker compositions to treat the landscaping or marker material or to allow for the mixing of different landscaping or marker compositions to achieve a desired effect.

A schematic of another employable foaming system is shown in FIG. 2. The foaming system 2 of FIG. 2 comprises at least one receptacle 50 (e.g., a drum or tank) containing one or more elements of a landscaping or marker composition in liquid form, a treatment pump 52, a solvent line 54, a solvent pump 56, a foam block 58 for combining the compressed gas with the pre-foam landscaping or marker composition, an air compressor 60 which supplies the compressed gas stream, and a foam discharge line or hose 64.

Foaming system 2 also preferably includes an adjustable air regulator 62. The foam block 58 is fluidly coupled to the solvent pump 56, the treatment pump 52, the air regulator 62, and the foam discharge line 64. The solvent pump 56 is fluidly coupled to a solvent source (not shown) via the solvent line 54 and delivers the solvent (usually water) to the foam block 58. The treatment pump is fluidly connected to the at least one receptacle 50. The treatment pump 52 delivers the contents of the at least one receptacle 50 to the foam block 58. The foam block 58 combines the contents of the receptacle and the solvent with compressed air from the air compressor 60 to produce a foamed landscaping or marker composition which is discharged through foam discharge line 64. Foam block 58 may be of the kind described in U.S. Pat. No. 4,474,680 to Kroll. The foaming system may also include at least one nozzle 66 or a manifold having a plurality of nozzles, which is attached to the foam discharge line. Further, foaming system 2 may also include a static mixer (e.g., a pipe with glass beads) coupled to the foam block 58 and foam discharge line 64 to ensure adequate mixing of the contents of the receptacle 50 and the water.

In the embodiment shown in FIG. 2, unlike the embodiment shown in FIG. 1, the contents of the receptacle 50 (preferably, a concentrated solution containing a landscaping or marker treatment, a surfactant and a solvent), is fed into the inlet port of the treatment pump 52 and discharges into the foam block 58, thereby eliminating the potential negative effects of having particulate material in the solvent pump, thus extending pump life. The preferred location for injection is the downstream side of the liquid flow control orifice in the foam block 58.

Schematics of two other employable foaming systems are shown in FIG. 3A and B, wherein air aspirated nozzles are employed to produce foam rather than a foam block. The foaming system 30 of FIG. 3A comprises at least one receptacle 70 (e.g., a drum or tank) containing one or more elements of a landscaping or marker composition in liquid form, a treatment pump 72, a second pump 74, a foamable liquid line 76, air aspirated nozzles 78, and a solvent (e.g., water) source 80. The treatment pump 72 is fluidly connected to the at least one receptacle 70 and the inlet port of the second pump 74. The foamable liquid line 76 is fluidly connected to the air aspirated nozzles 78. The solvent source 80 is fluidly connected to the second pump 74.

Referring to FIG. 3A, in one alternative method, a colorant (landscaping or marker treatment) and surfactant (foaming agent) mixture in the receptacle 70 is injected via the treatment pump 72 into an inlet port of the second pump 74. Water from a solvent source 80 also enters the second pump 74. Because this method calls for a potentially abrasive material (colorant pigment) to be pulled through the second pump 74, a severe duty pump is preferably used, such as a Hydracell H25 pump manufactured by Wanner Engineering Inc. of Minn, Minn. The pump 74 is preferably capable of pressurizing the combined colorant/surfactant/water mixture to 250 psi for delivery to the air aspirated nozzles 78. The treatment pump 72 is preferably a peristaltic type pump, such as a Watson-Marlow-Bredel SC-15 model or a Delansco peristaltic type hose pump manufactured by ABO Industries Inc. of San Diego, Calif. In this embodiment, the treatment pump 72 would not be required to develop more than about 50 psi since the colorant is dispensed into the inlet port of the second pump. Preferably, the treatment pump 72 has variable speed adjustment capability. Also, preferably, the foamable liquid line 76 is a hose having a 2" diameter and is capable of withstanding up to 300 psi or more.

The foaming system 35 of FIG. 3B comprises at least one receptacle 82 (e.g., a drum or tank) containing one or more elements of a landscaping or marker composition in liquid form, a treatment pump 84, a solvent pump 86, a foamable liquid line 88, air aspirated nozzles 90, and a solvent (e.g., water) source 92. The treatment pump 84 is fluidly connected to the at least one receptacle 70 and the foamable liquid line 88 after the discharge end of the solvent pump 86. The foamable liquid line 88 is fluidly connected to the solvent pump 86, the treatment pump 84, and the air aspirated nozzles 90. The water source 92 is fluidly connected to the solvent pump 86.

Referring to FIG. 3B, according to another alternative method, a colorant (landscaping or marker treatment) and surfactant (foaming agent) mixture in the receptacle 82 is injected via the treatment pump 84 into a stream of pressurized water exiting the solvent pump 86, after the discharge end of the solvent pump 86. Water from a water source 92 enters the inlet port of the solvent pump 86. In this embodiment, the solvent pump 86 can be a less abrasive resistant pump, such as a CAT pump model 2520, because it is not required to handle the abrasive colorant. Preferably, the solvent pump is capable of delivering the water at 25 gpm or more and at a pressure of up to 250 psi or more. The treatment pump in this embodiment would need to dispense the colorant mixture at a higher pressure than the embodiment depicted in FIG. 3A because such mixture is not being dispensed and pressurized through the solvent pump. Preferably, a pump such as a PCM Progressive Cavity Pump model 6120, manufactured by ABO Industries Inc. is used as the treatment pump. Preferably, the treatment pump 84 has variable speed adjustment capability. Also, preferably, the foamable liquid line 88 is a hose having a 2" diameter and capable of withstanding up to 300 psi or more.

As another alternative to the embodiment depicted in FIGS. 3A and 3B, a separate solvent source is not included, but rather the receptacle 70, 82 contains the landscaping or marker composition in a ready-to-be-foamed concentration. In such embodiment, only one pump is required, preferably one sufficient to handle abrasive materials and having a capacity to deliver the composition to the air aspirated nozzles at up to 250 psi or more. This embodiment would be beneficial where it is not possible to obtain a separate source of water.

Air aspirated nozzles for use in foaming system 30, 35 are commercially available. Acceptable air aspirated nozzles include, for example, Scotty 4003 Air Aspirated Fire Fighting Nozzles manufactured by Scott Plastics of Vancouver, BC. The amount of nozzles used and the aperture type for the nozzles are preferably selected to maintain 250 PSI at each nozzle inlet. Preferably, the air aspirated nozzles are customized by replacing a fixed orifice inside the nozzle with a removable insert comprised of a plastic/glass composite to increase abrasion resistance.

Foaming systems 1, 2, 30, 35, as illustrated in FIGS. 1-3B may further include a flushing loop (not shown) for purging a particular landscaping or marker composition from the system before exchanging for another landscaping or marker composition in order, for example, to avoid a mixing of colors. Preferably, the pumps employed in each foaming system include at least one control for adjusting or metering the amount and/or flow of contents from the receptacles, water source, and compressed gas. A variable speed pump for receptacles which contain treatment will allow the treatment level to be increased without an increase in water flow, where the water is added separately. Also, preferably, the systems include instruments for monitoring the flow and pressure of the contents of each of the receptacles, water source and compressed gas. As described above with respect to foaming system 1, each system may include means for allowing the exchange of receptacles and the combining of contents from a plurality of receptacles to achieve a desired effect. These features allow the foaming system to be adjustable continuously to ensure a proper end product.

The foaming systems 1, 2, 30, 35 of FIGS. 1-3B may further include a remote control device for remotely activating, adjusting and inactivating the components of the system. The at least one receptacle 10, 50, 70, 82 may also include a stirrer, for example, to aid in continued pigment dispersion where a pigment colorant is being employed. Further, the foaming system may also include a means for heating the solvent and/or landscaping or marker treatment, such as, for example, heating coils. In each foaming system, the pumps may by electrically or hydraulically powered. The foaming systems 1, 2, 30, 35 may also include insulating materials or heat pads to protect the system from freezing temperatures. The foaming systems may further include a computer for operating control, data collection, system monitoring, overriding, generation of performance reports, and/or location monitoring. Although shown in FIGS. 1-3B as having a single receptacle wherein all of the elements of the landscaping or marker composition are combined (except for the solvent in FIGS. 2 and 3A-B), other variations are contemplated and covered by this invention. For example, the foaming systems 1, 2, 30, 35 may include a plurality of receptacles, each carrying a separate landscaping or marker composition element (e.g., one for a colorant pigment dispersion and one for a surfactant/water solution). In one embodiment, the foaming system comprises a plurality of treatment containing receptacles (e.g., each having a different colorant pigment, or one or more having a colorant pigment and one or more having a different treatment substance, e.g., an oil or combination of oils for providing a fragrance, insect repellant and/or appearance enhancer) and a surfactant containing receptacle. In still another embodiment, the foaming system comprises a plurality of treatment containing receptacles, each containing a surfactant and treatment material. This allows for the adjustable combination of different colored colorants and other treatments to achieve any desired landscaping or marker material color and/or effect. It also allows for a quick and efficient exchange of colorants (or other treatments) to allow for an essentially continuous process of treating the landscaping or marker materials without having any substantial interruption.

The step of applying the foamed landscaping or marker composition preferably comprises using a foam dispensing landscaping material processing machine to apply the foamed landscaping or marker composition to the landscaping or marker material. The foam dispensing landscaping material processing machine includes a foaming system, such as the ones disclosed above, coupled to a landscaping material processing machine, such as mulch mixing devices, trommel (e.g., auger-type mixing devices), whole tree wood chipper devices, horizontal grinder devices, tub grinder devices (or other types of grinder devices), blower trucks, leaf or windrow turners, collection trucks, batch mixers and leaf vacuum trucks. The foam dispensing landscaping material processing machine may comprise an existing commercially available landscaping material processing machine which has been retrofitted with a foaming system, or a landscaping material processing machine which includes an integrated foaming system. Examples of currently existing machines which may be easily retrofitted to couple to the foaming system include, for example, processing machines manufactured by Fecon, Inc. of Cincinnati, Ohio, Morbark, Inc. of Winn, Mich., PowerScreen of Louisville, Ky., Peterson Pacific Corp. of Eugene, Oreg., McCloskey Brothers Manufacturing of Ontario, Canada, Komptech of Germany, Erin Systems of Portland, Me., Extec of England, and Becker Underwood of Ames, Iowa.

Referring to FIGS. 4A-12, according to another aspect of the present invention, an foam dispensing landscaping material processing machine is disclosed for applying a foamed landscaping or marker composition to landscaping or marker materials. The foam dispensing landscaping material processing machine comprises a landscaping material processing machine and a foaming system. FIGS. 4A-12 show various landscaping material processing machines incorporating a foaming system. The foaming system may be, for example, a separate unit (which may be portable) that is coupled to the processing machine or may be integrated into the processing machine itself. The foaming system in each machine may comprise any system which allows foam to be formed and discharged, but preferably comprises one of the foaming systems described above. The landscaping material processing machine may be, for example, a mulch mixing device, a trommel device, a whole tree wood chipper device, a horizontal grinder device, a tub grinder device, a blower truck, a leaf or windrow turner, a collection truck, a batch mixer or a leaf vacuum truck.

Figure 4A:
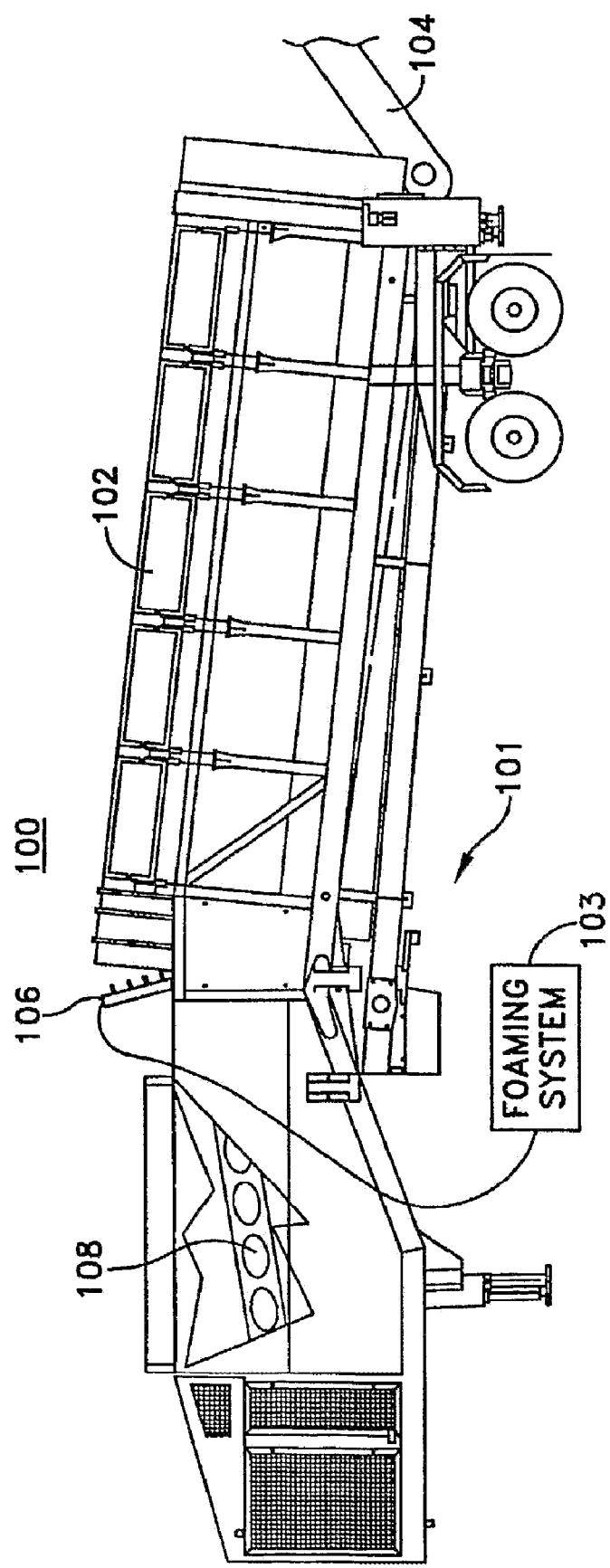
FIG. 4A is a side view of a foam dispensing trommel device according to one aspect of the present invention.
Figure 4D:
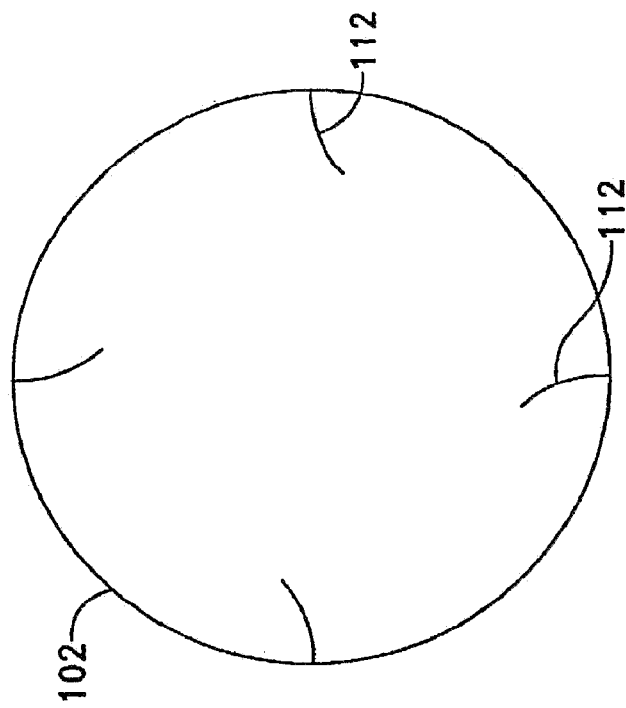
FIGS. 4B and 4D are cross sectional views of the rotating drum of the trommel device of FIG. 4A.
Figure 4E:
FIG. 4E is a front view of tines for the rotating drum of the trommel device of FIG. 4A.
Figure 4B:
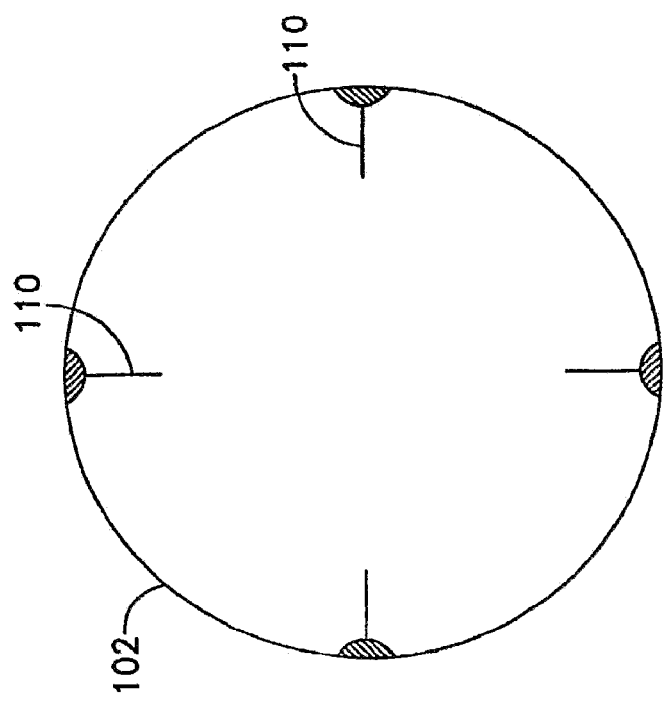
Figure 4C:
FIG. 4C is a front view of a paddle for the rotating drum of the trommel device of FIG. 4A.

Referring to FIGS. 4A-4E, a foam dispensing trommel system 100 is shown comprising a trommel device 101 and a foaming system 103. The trommel device 101 includes a rotating drum 102 and means 104 for discharging a treated landscaping or marker material. The foaming system includes means 106 for dispersing the foamed landscaping or marker composition onto the landscaping or marker material. Preferably, the system 100 further comprises a means 108 for feeding the landscaping or marker material into the rotating drum 102 and a means 110, 112 for enhancing mixing. The rotating drum 102 may be a commercially available screened trommel rotating drum which has been modified with a substantially solid liner, such as an ultra high molecular weight (UHMW) polyethylene liner, or may be a substantially solid (without perforations) rotating drum. Preferably the rotating drum 102 is a variable pitch drum. The feeding means 108 and discharging means 104 may be a conveyor belt (folding or radial, for example), a series of rollers, or screw augers, for example, or any other feeding or discharging mechanism. Referring to FIGS. 4B-4E, the enhancing means may include, for example, paddles 110 or tines 112. The paddles 110 or tines 112 may be straight or curved, and may be continuous along the length of the drum 102 or staggered at various intervals. The dispersing means 106 includes, for example, one or more nozzles or a manifold system having one or more nozzles. According to one preferred embodiment, the dispersing means 106 is located at an end of the rotating drum 102 which is adjacent to the feeding means 108 as shown in FIG. 4A. However, the means for dispersing 106 may be located at alternative locations on the trommel device and may also be located at more than one location. This trommel device is well suited to apply a foamed landscaping or marker composition to substantially any type of landscaping or marker material, including mulch, wood chips, particularized rubber material, sand, gravel and stone, salt and other materials having a wide-ranging particle size.

Figure 4F:
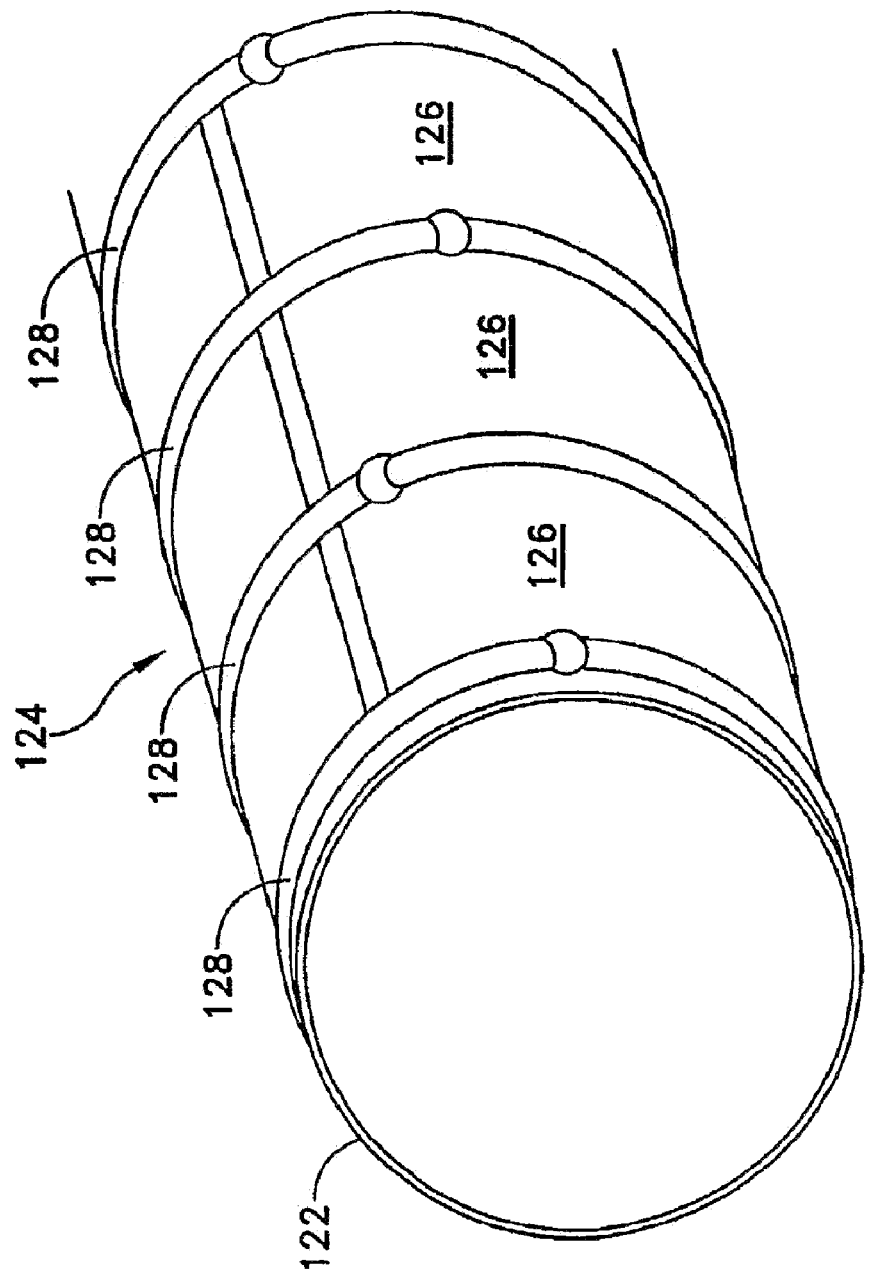
FIG. 4F is a perspective view of a lined trommel device according to another aspect of the present invention.

Referring to FIG. 4F, according to another aspect of this invention, a drum for a liner modified trommel device is shown comprising a rotatable drum 122 that has been equipped with a liner 124. (Typically, trommel devices are equipped with screens having openings of varying dimensions for use in applications such as topsoil screening.) The liner 124 may be secured to and surround the outside of the rotatable drum 122 or alternatively may be secured to and surround the inside of the rotatable drum. The liner 124 may be formed of a variety of materials, such as plastic, rubber or fabric, or metal. In one preferred embodiment, the liner 124 is formed of polyvinyl chloride. As shown in FIG. 4F, the liner 124 may be comprised of a plurality of tarps 126 which are secured together by straps 128, the straps also being used to secure the liner 124 to the rotatable drum 122. Tarps which may be used include those sold by Cambridge Canvas Centre Limited of Cambridge, Ontario, Canada. Although the modified trommel device is advantageously used in connection with a foaming system, its use is not restricted thereto, but rather, the modified trommel device may be employed in the treatment of landscaping or marker materials whether via foaming or known aqueous methods, or other methods which would be obvious to one of ordinary skill in the art.

Figure 5:
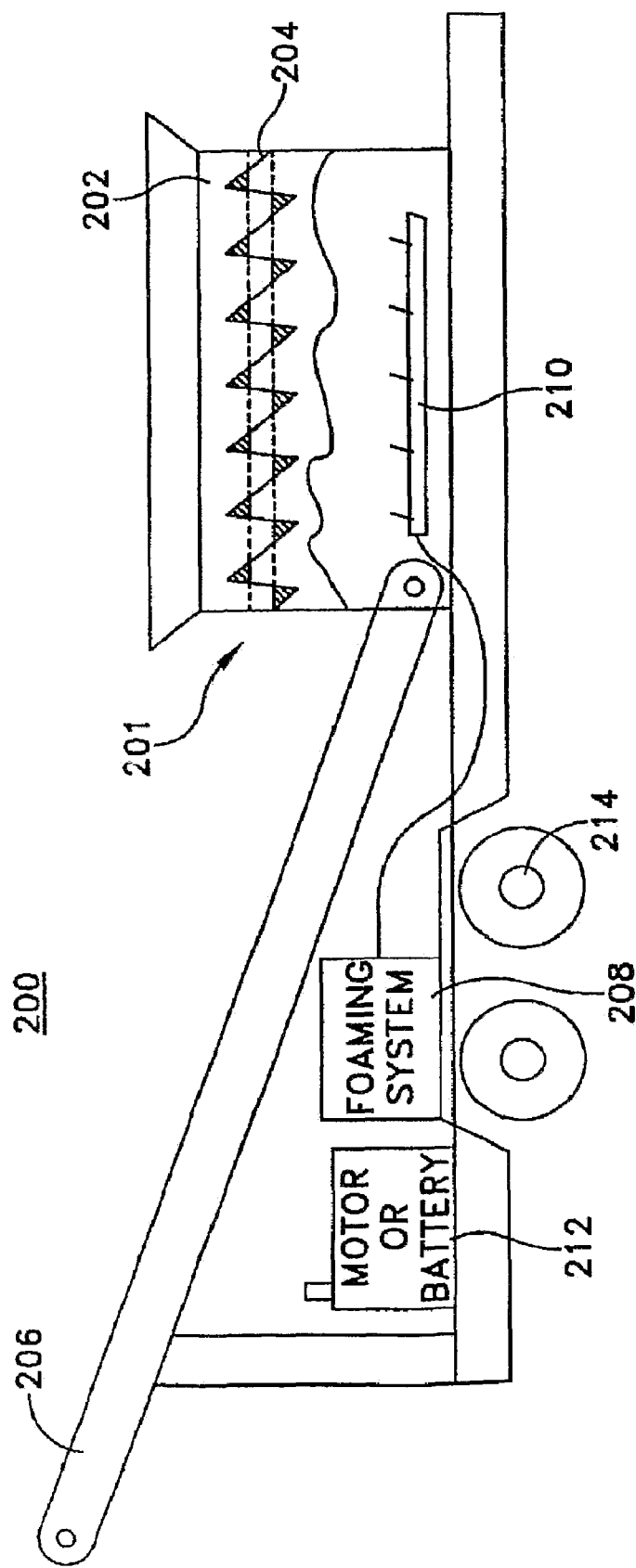
FIG. 5 is a side view of a foam dispensing auger-type mixing device shown in partial cross-section according to one aspect of the present invention.

Referring to FIG. 5, a foam dispensing auger-type mixing system 200 is shown comprising a auger-type mixing device 201 and a foaming system 208. The mixing device 201 includes a hopper 202 for containing the landscaping or marker material, at least one auger 204 for mixing the foamed landscaping or marker composition onto the landscaping or marker material, means 206 for discharging the treated landscaping or marker material, and means 212 for powering the auger-type mixing device (which may be, for example, a gas engine or battery powered motor). The foaming system 208 includes means 210 for dispersing the foamed landscaping or marker composition onto the landscaping or marker material. The discharging means 206 may be a conveyor belt, series of rollers, or screw augers, for example, or any other feeding or discharging mechanism known to one of ordinary skill in the art. The dispersing means 210 includes, for example, one or more nozzles or a manifold system having one or more nozzles. According to one preferred embodiment, the dispersing means 210 is located towards a bottom of the hopper 202 and includes a plurality of nozzles spaced along the circumference of the hopper 202 as shown in FIG. 5. However, the dispersing means 210 may be located at alternative locations on the auger-type mixing device 200 and may also be located at more than one location. The auger-type mixing device 201 may be a portable device, as shown in FIG. 5, including means 214 for transporting the device. The discharging means 206 may be stationary or may be capable of rotating to allow for discharge of the landscaping or marker materials onto different areas. (Alternatively both the hopper and the discharging means 206 may be rotatable.) The auger-type mixing device 201 may further include a liner (such as a high molecular weight polyethylene liner) in the hopper 202 to reduce friction, commingling of treatments or the potential for landscaping or marker material substrates to stick in the corners of the machine.

Figure 6:
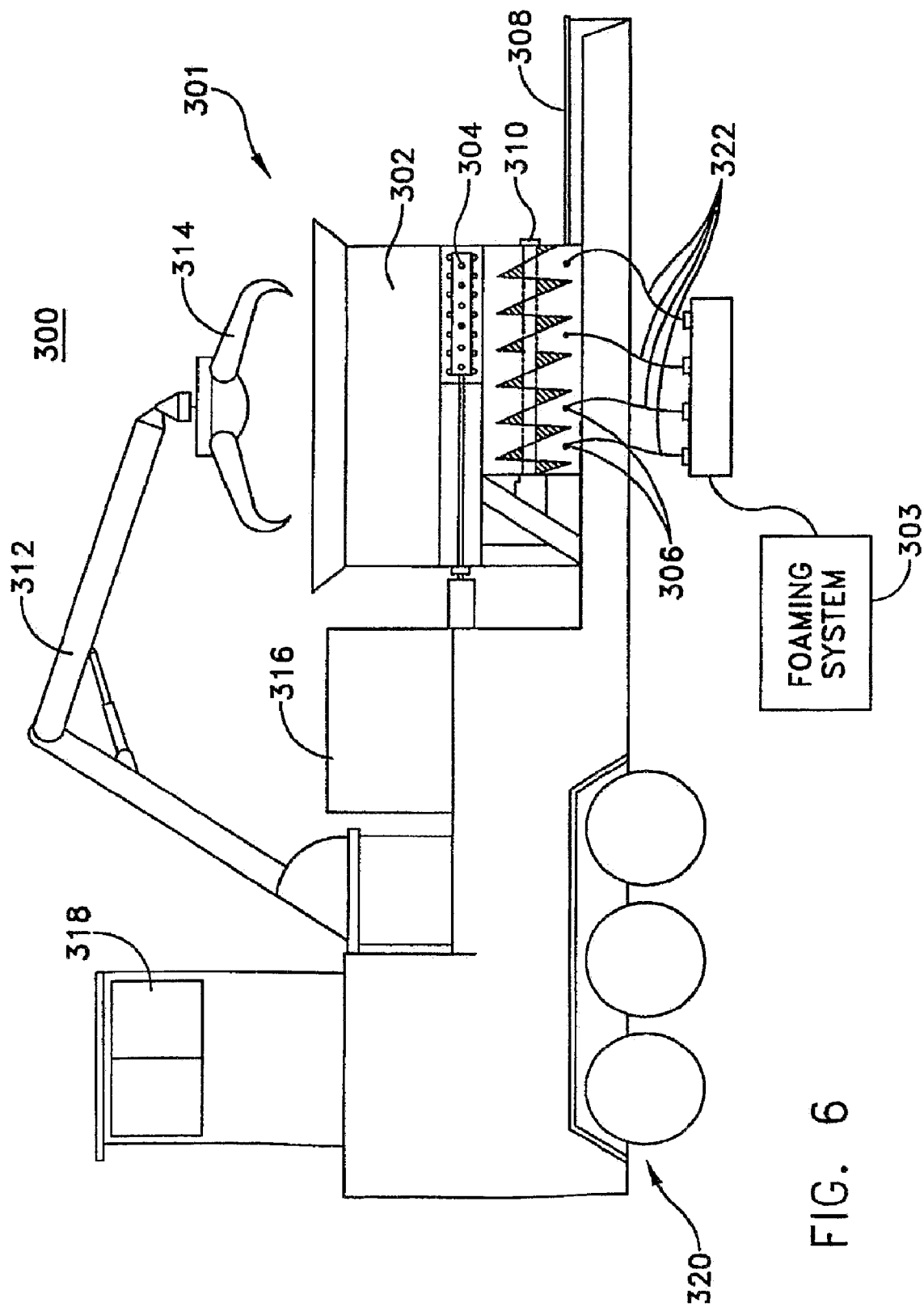
FIG. 6 is a side view of a foam dispensing tub grinder device according to one aspect of the present invention.

Referring to FIG. 6, a foam dispensing tub grinder system 300 is shown comprising a tub grinder 301 and a foaming system 303. The tub grinder 301 includes a hopper 302, a grinding means 304 for grinding raw materials or products into landscaping materials, and means 308 for discharging the treated landscaping materials. The foaming system 303 includes means 306 for dispersing the foamed landscaping treatment onto the landscaping materials. Preferably, the system 300 further comprises one or more of the following: a mixing auger 310 under the grinding means 304 to enhance mixing of the foamed landscaping composition and landscaping materials; a crane 312 and grapple 314 for lifting raw materials or products to grind into landscaping materials into the hopper 302; a power unit 316 for powering the device; an operator compartment 318; transportation means 320; and means for rotating (not shown) the hopper and means for discharging 308 to allow the landscaping materials to be discharged onto different areas. The grinding means 304 may comprise a hammer mill, for example. The dispersing means 306 the foamed landscaping composition includes, for example, one or more nozzles or a manifold system having one or more nozzles. In a preferred embodiment, the dispersing means 306 is located toward a bottom of the hopper 302 and along the length of the mixing auger 310. However, the dispersing means 306 may be located at alternative locations on the tub grinder system 300 and may also be located at more than one location. Although the foaming system 303 as shown in FIG. 6 includes a plurality of nozzles each attached to a separate foam discharge line 322, the plurality of nozzles may be attached to a manifold which is coupled to a single discharge line. The tub grinder system 300 is especially beneficial for turning raw materials such as tree stumps, limbs or branches, or waste products such as pallets, into treated (e.g., colored) landscaping materials in one step. The tub grinder device may further include a liner (such as a high molecular weight polyethylene liner) located on the inside walls and bottom of the hopper in the area enclosing the augers to reduce friction and/or to reduce commingling of treatments when treating landscaping materials with different treatments (e.g., different colorants) in the same machine.

Figure 7A:
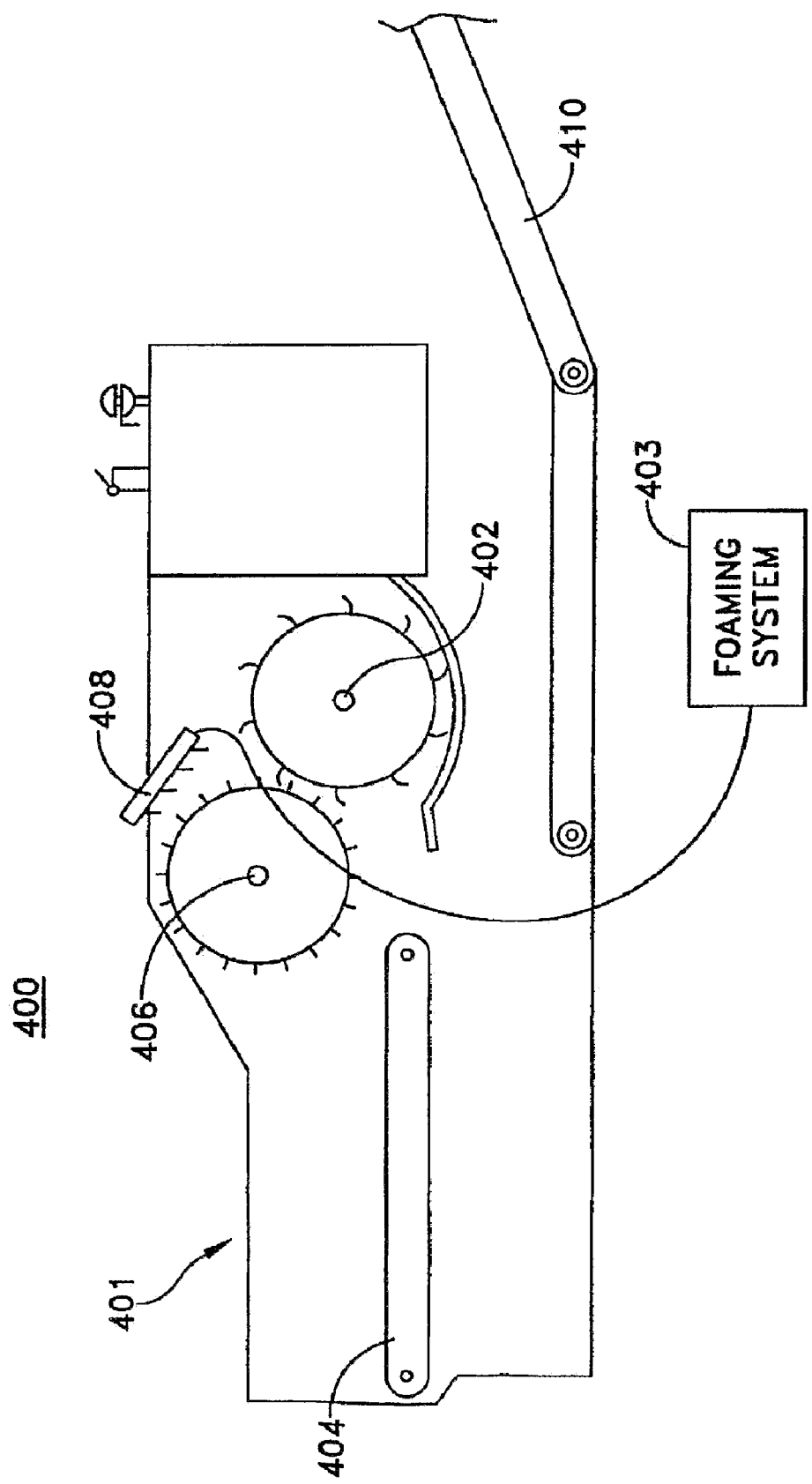
FIG. 7A is a side view of a foam dispensing horizontal grinder device according to one aspect of the present invention.

Referring to FIG. 7A, a foam dispensing horizontal grinder system 400 is shown comprising a horizontal grinder 401 and a foaming system 403. The horizontal grinder 401 includes a grinding means 402 for grinding raw materials or waste products into landscaping materials, means 404 for feeding the raw materials or waste products into the grinding means 402 (e.g., a hammer mill), a feeder wheel 406 for compressing and advancing the raw materials or waste products into the grinding means 402, and a means 410 for discharging the treated landscaping materials. The foaming system 403 includes means 408 for dispersing the foamed landscaping treatment onto the landscaping materials. The feeding means 404 and discharging means 410 may be a conveyor belt, series of rollers, or screw augers, for example, or any other feeding or discharging mechanism. The dispersing means 408 includes, for example, one or more nozzles or a manifold system having one or more nozzles. In one preferred embodiment, the dispersing means 408 is located between the feeder wheel 406 and grinding means 402. However, the dispersing means 408 may be located at alternative locations on the horizontal grinder system 400 and may also be located at more than one location.

Figure 7B:
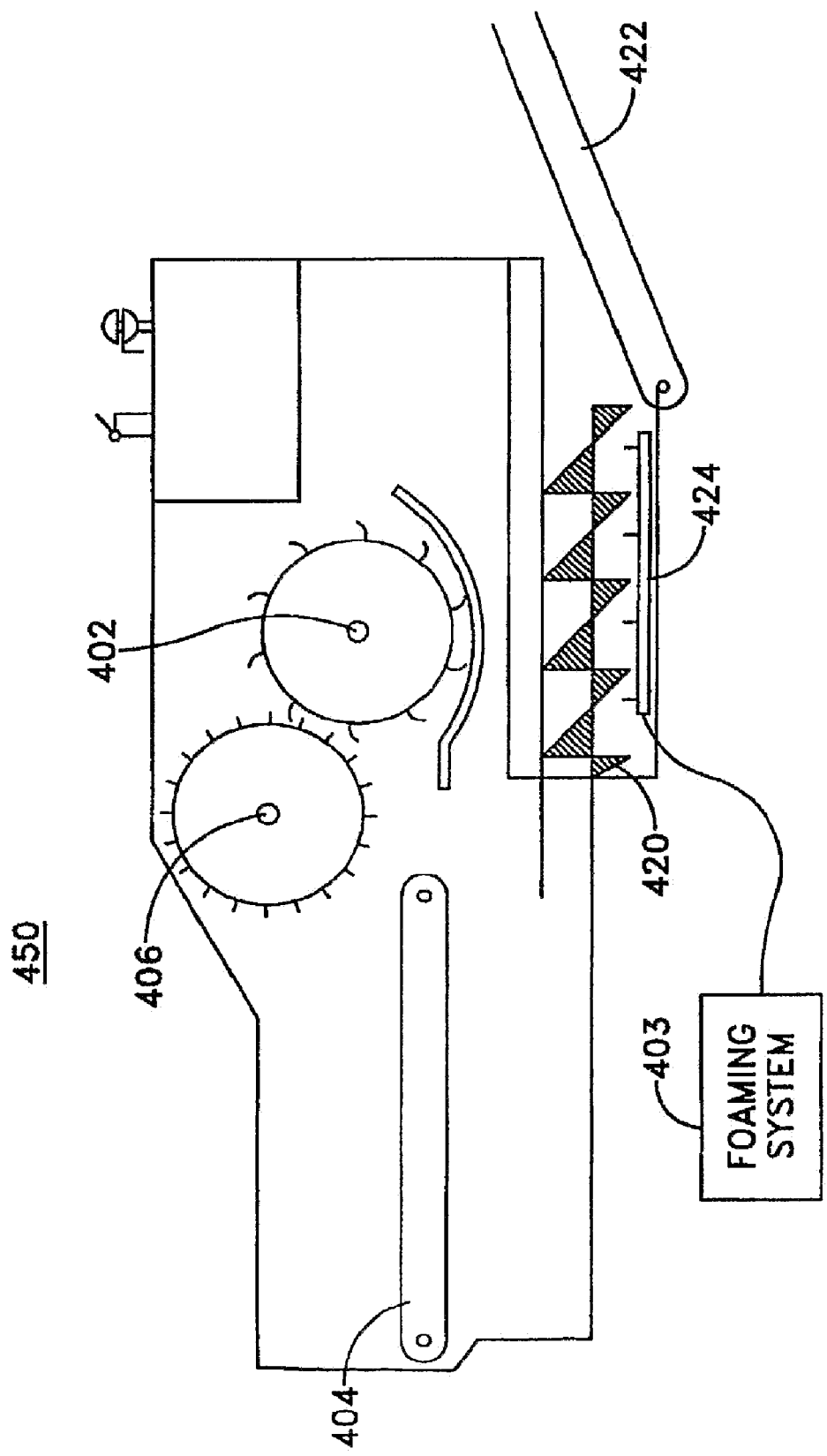
FIG. 7B is a side view of an alternative foam dispensing horizontal grinder device according to one aspect of the present invention.

In a preferred embodiment, as shown in FIG. 7B, the horizontal grinder 450 is modified to include one or more screw augers 420 in an enclosure located at a discharge port for the ground landscaping material (e.g., under the grinding means as shown in FIG. 7B). Preferably a separate conveyor 422 (such as a belt or other conveying means) is placed at a discharge area of the screw auger 420 for conveying the landscaping material out of the machine. (Typically, as shown in FIG. 7A, horizontal grinders simply include a conveyor belt for conveying the ground material out of the machine.) In the embodiment shown in FIG. 7B, the dispersing means 424 is preferably located at one or more locations along the screw auger 420, and more preferably at multiple locations along both sides of the screw auger 420. The inclusion of the screw augers allows the landscaping material to be thoroughly mixed and treated with the foamed landscaping composition. Although, the example includes a horizontal grinder, other embodiments include screw augers on all types of landscaping material grinding machines, regardless of their configuration, for application of a foamed landscaping composition onto landscaping materials. Preferably, the enclosure housing the screw augers further includes a liner located on the inside walls and bottom of the enclosure (such as a high molecular weight polyethylene liner) to reduce friction and/or to reduce commingling of treatments when treating landscaping materials with different treatments (e.g., different colorants) in the same machine.

Figure 7C:
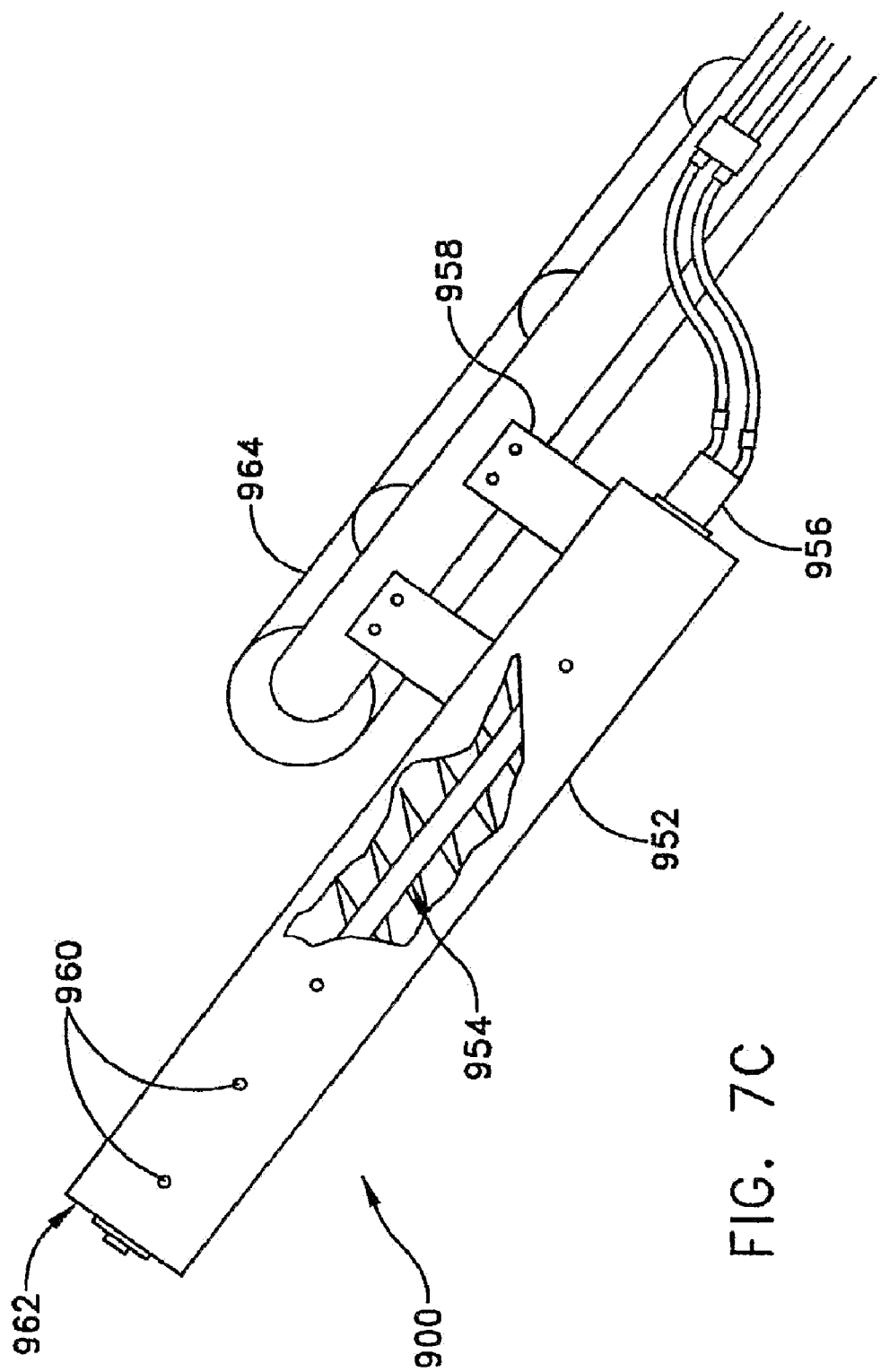
FIG. 7C is a side view, partially cut-away, of a screw auger attachment according to one aspect of the present invention, shown attached to a conveyor belt of a grinding machine.

Referring to FIG. 7C, in another embodiment, a screw auger attachment 900 for attachment to a foam dispensing landscaping material processing machine comprises an enclosure 952 housing one or more screw augers 954, a drive motor 956 (preferably hydraulic) for driving the screw augers 954, at least one attachment component 958 for attaching the enclosure 952 to a machine for grinding landscaping materials, and a means 960 for dispensing a landscaping or marker composition into the enclosure 952. Preferably the enclosure 952 is formed from a light weight material, such as aluminum or a composite material like a carbon fiber composite, and also is preferably lined with a drag reducing material, such as a high molecular weight urethane, to reduce the friction of the landscaping or marker materials being advanced by the augers. Preferably the drag-reducing material is also abrasion resistant to be able to withstand certain abrasive treatment materials, such as colorant pigments. Preferably, the enclosure 952 is sized to correspond to the size of the discharge conveyor and output specifications of the machine to which it is attached. In one preferred embodiment, the enclosure 952 is four to eight feet in length and two to six feet in width. The enclosure includes a discharge opening 962 where the mixed landscaping or marker materials are discharged for stockpiling or transport.

The drive motor 956 preferably uses the existing auxiliary oil supply from the machine to which the screw auger attachment is connected. There are preferably two screw augers 954 for mixing and advancing the ground landscaping or marker materials. The length and diameter of the augers 954 may vary in accordance with the output specifications of the machine to which it is attached, but preferably the augers are about eight to fourteen inches in diameter and four to eight feet in length.

The dispensing means 960 may include any mechanism for allowing a landscaping or marker composition to be injected into the enclosure, but preferably includes one or more openings for attachment of spray nozzles. Preferably the openings 960 are located at multiple locations along the length of the enclosure 952, as shown in FIG. 7C. The screw auger attachment 900 may further include nozzles for injecting the landscaping or marker composition on to the landscaping or marker materials.

The attachment component 958 may comprise any mechanical means for attaching the enclosure to the machine for grinding landscaping materials. The attachment component 958 may be hinged to fold up or down and/or may be on slide rails to avoid interference during normal transport and movement of the host machine.

Referring again to FIG. 7C, the screw auger attachment 900 is shown attached to a discharge conveyor belt 964 of a machine for grinding landscaping materials. Although the screw auger attachment is advantageously used in connection with a foaming system on a machine for grinding landscaping materials, its use is not restricted thereto, but rather, the screw auger attachment may be employed in the treatment of landscaping or marker materials whether via foaming or known aqueous methods, or other methods which would be obvious to one of ordinary skill in the art.

Figure 8:
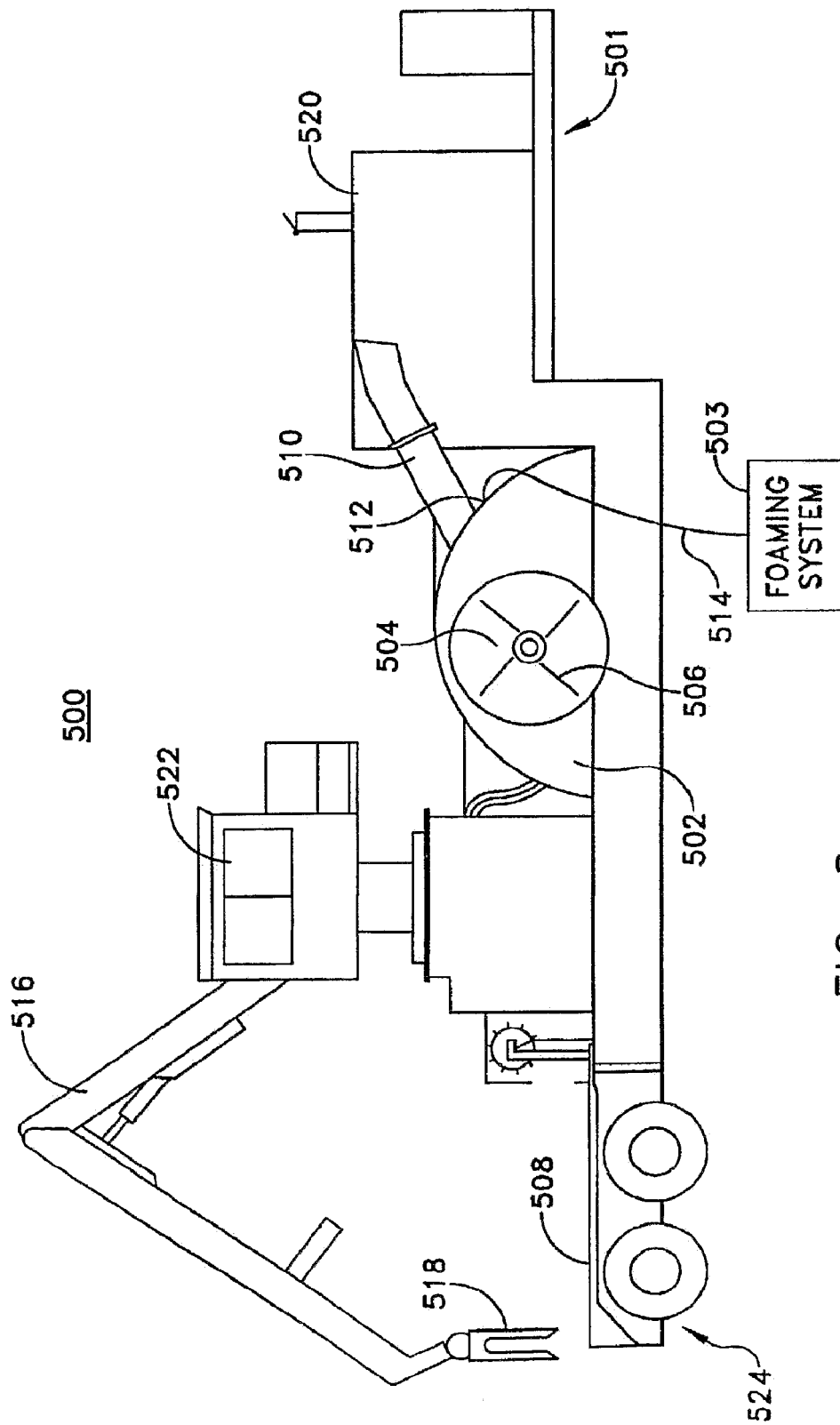
FIG. 8 is a side view of a foam dispensing whole tree chipper device according to one aspect of the present invention.
Figure 9:
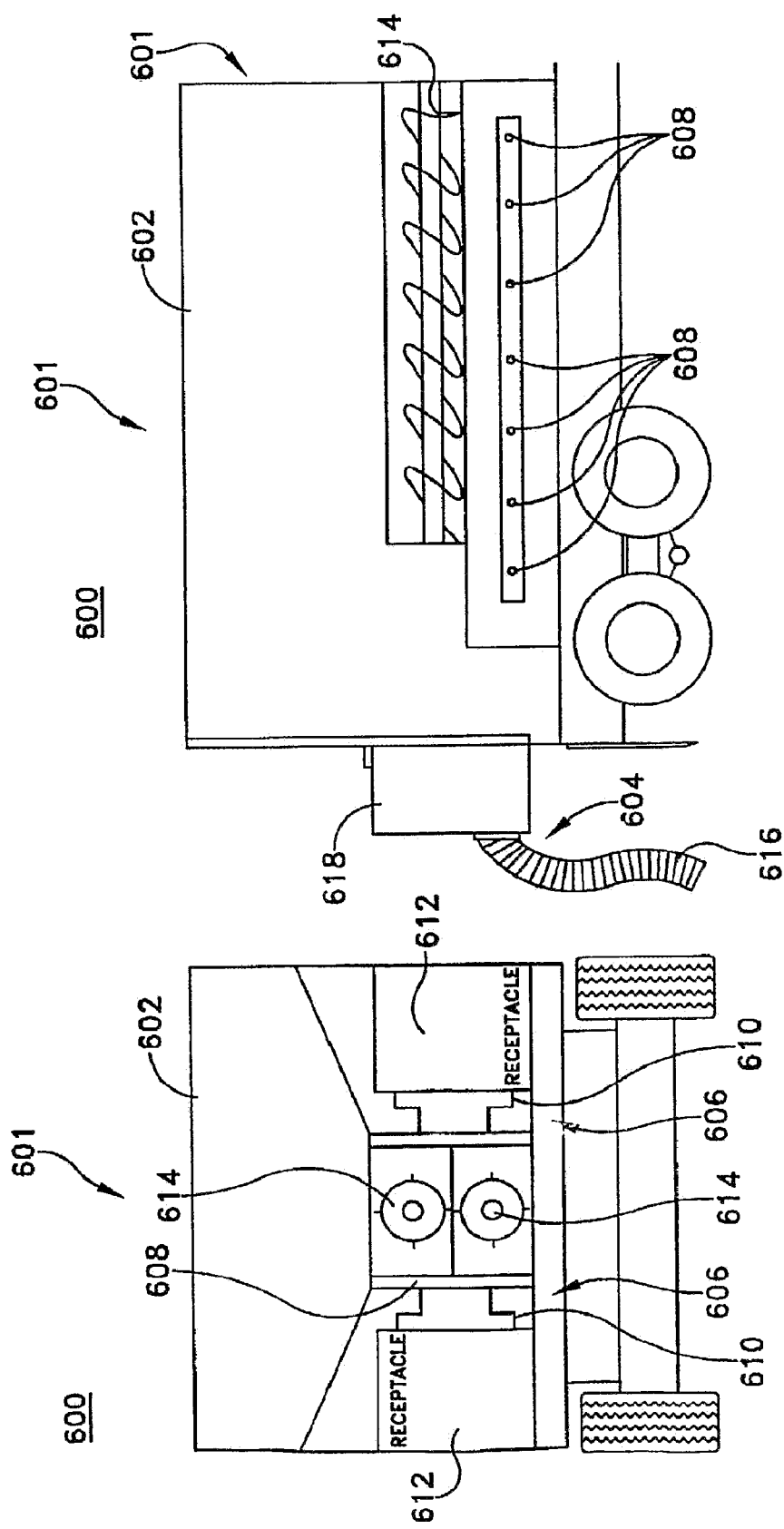
FIG. 9A is a cross sectional rear view of a foam dispensing blower truck according to one aspect of the present invention.
FIG. 9B is a side view of the foam dispensing blower truck of FIG. 9A shown in partial cross-section.

Referring to FIG. 8, a foam dispensing whole tree chipper system 500 is shown comprising a whole tree chipper device 501 and a foaming system 503. The whole tree chipper device 501 includes a chipping chamber 502, chipper disc 504 having chipper knives 506 for cutting tree materials into landscaping materials, a means 508 for feeding tree materials such as whole trees, stumps, limbs or branches into the chipping chamber 502, a means for 510 discharging the treated landscaping material. The foaming system 503 includes means 512 for dispersing the foamed landscaping treatment onto the landscaping materials and at least one foam discharge line 514. Preferably, the system 500 further comprises one or more of the following: a crane 516 and grapple 518 for lifting the tree materials onto the feeding means 508; a power unit 520 for powering the device; an operator compartment 522; and transportation means 524. The feeding means 508 and discharging means 510 may comprise a conveyor belt, series of rollers, or screw augers, for example, or any other feeding or discharging mechanism. The dispersing means 512 includes, for example, one or more nozzles or a manifold system having one or more nozzles. In a preferred embodiment, the dispersing means 512 is located on at least one position on a wall 526 of the chipping chamber 502.

Referring to FIGS. 9A and 9B, a foam dispensing blower system 600 is shown comprising a blower truck 601 and a foaming system 606. The blower truck 601 includes a holding bin 602 having an opening for entry of a landscaping or marker material, means 604 for discharging a treated landscaping or marker material, and preferably at least one mixing member 614 for mixing the foamed landscaping or marker composition and landscaping or marker materials and advancing the treated landscaping or marking materials to the discharging means 604. The foaming system 606 includes means 608 for dispersing the foamed landscaping or marker composition onto the landscaping or marker material, one or more foam discharge lines 610, and at least one receptacle 612 for holding at least one element (e.g., colorant or surfactant, or a combination of elements) of a landscaping or marker composition. The discharging means 604 preferably comprises a blower hose 616 and a blower box 618 containing a power unit for propelling the landscaping materials through and out of the blower hose 616. The mixing members 614 are preferably one or more screw-type augers. Preferably, there are two screw-type augers positioned one on top of the other as shown in FIG. 9A.

The dispersing means 608 includes, for example, one or more nozzles or a manifold system having one or more nozzles. According to one preferred embodiment, the dispersing means 608 is located proximate to and along the length of the mixing members 614 and comprises a plurality of nozzles placed at spaced intervals along the length of mixing members 614. Where the system 600 comprises two screw-type augers positioned one on top of the other, preferably the nozzles are placed at spaced intervals along the length of the bottom auger as shown in FIG. 9B. However, the dispersing means 608 may be located at alternative locations on the blower system 600 and may also be located at more than one location. The blower truck 601 may further include a liner (such as a high molecular weight polyethylene liner) located on the inside walls and bottom of the holding bin to reduce friction or commingling of treatments. Preferably the blower hose is lined with a non-stick material for reducing drag of the landscaping or marker material as it is discharged from the blower truck.

Figure 10:
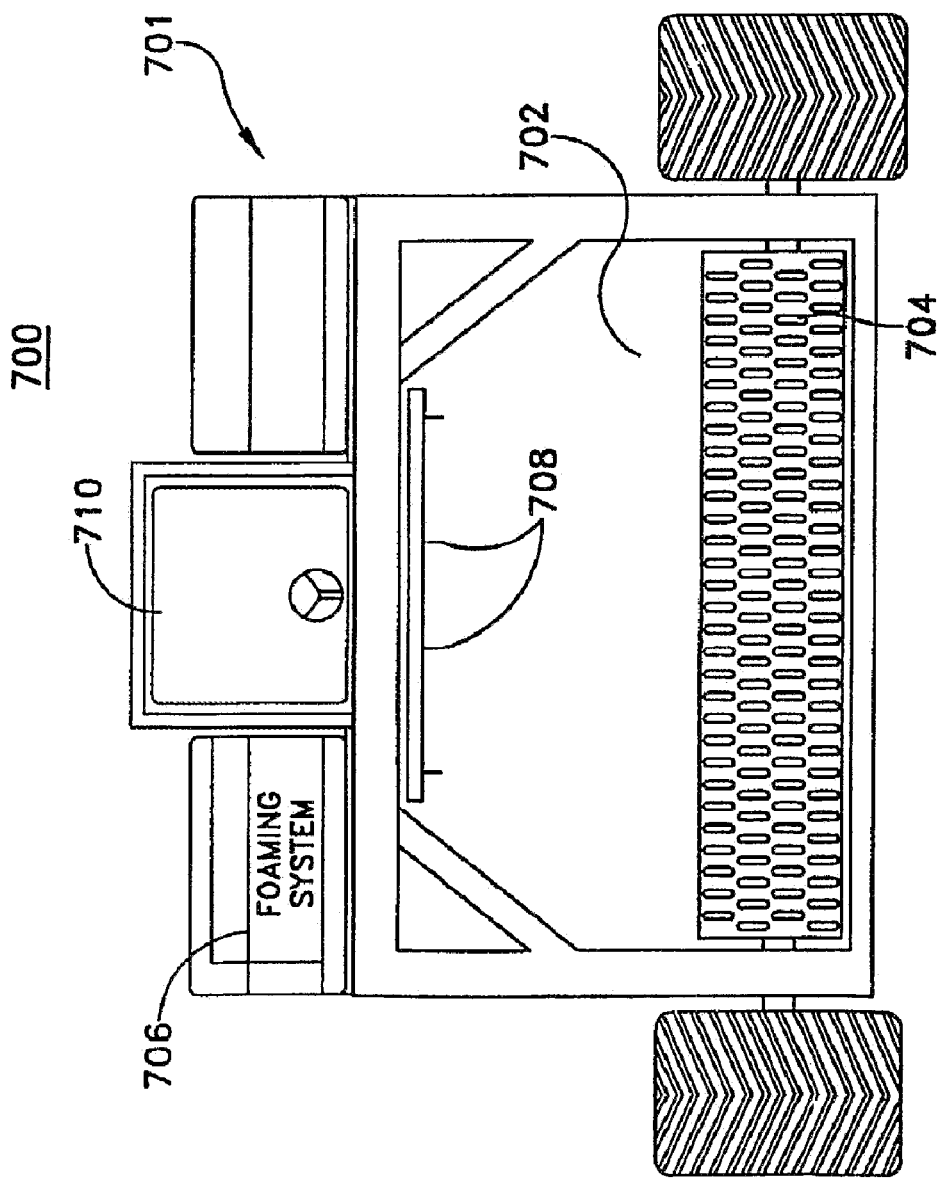
FIG. 10 is a cross sectional view of a foam dispensing compost turner according to one aspect of the present invention.

Referring to FIG. 10, a foam dispensing compost turner system 700 is shown comprising a compost turner 701 and a foaming system 706. The compost turner 701 includes a holding bin 702, and a turning means 704. The foaming system 706 includes means 708 for dispersing the foamed landscaping composition onto the landscaping material and at least one receptacle (not shown) for holding at least one element (e.g., colorant or surfactant, or a combination of elements) of a landscaping composition. Preferably, the device further comprises an operator compartment 710 for operating the compost turner 700. The compost turner is especially useful for treating compost with plant aging or plant decomposition accelerating materials.

Any of the above described landscaping processing machines may also include a UV light source, such as a UV lamp, for curing landscaping or marker materials (especially rubber or aggregate materials) with UV curable resins. Referring to FIGS. 11A and 11B, the trommel device 100 of FIGS. 4A-4E is shown further comprising a UV light source or lamp 114. Preferably, the device 100 further comprises at least one lamp bar, which may be a longitudinal bar 116 running the length of the trommel drum as shown in FIG. 11A and/or may be a crossbar 118 as shown in FIG. 11B. Preferably the bars 116, 118 have a means 120, 122 for allowing vertical adjustment.

Figure 12:
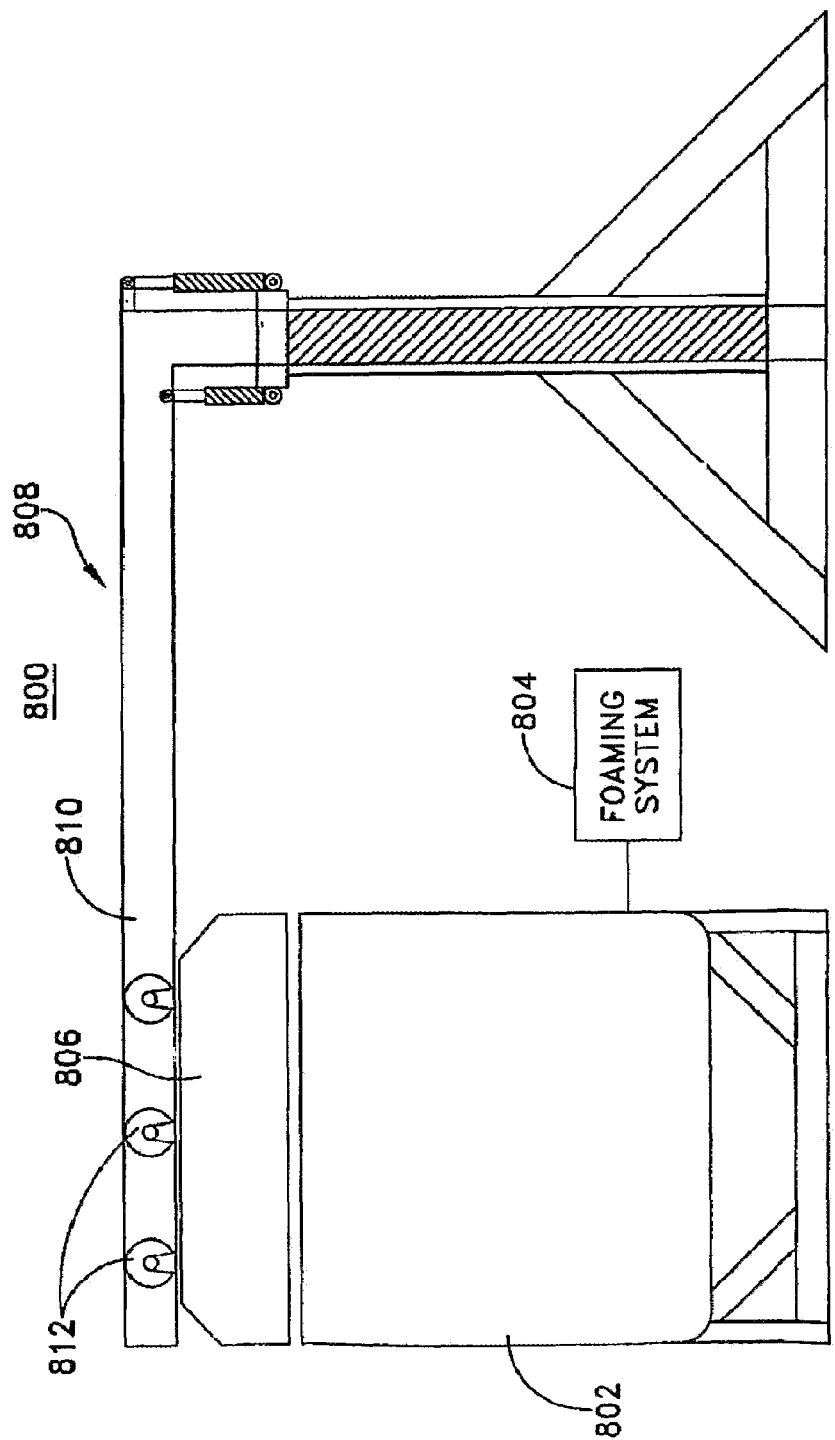
FIG. 12 is a front view of a foam dispensing batch mixer according to one aspect of the present invention including a UV light source.

Referring to FIG. 12, a foam dispensing batch mixer 800 is shown comprising mixing bin 802, a foaming system 804, and a UV light source or lamp 806. Preferably, the mixer 800 further comprises a means 808 for advancing or retracting the UV lamp to and from the mixing bin 802. Preferably, the means for advancing or retracting includes a track 810 with rollers 812 on which the UV lamp 806 is moved. The above described apparatuses and foaming systems would generally be employed in commercial or large volume treatment of landscaping or marker materials. However, the foaming method for treating landscaping or marker materials may also be performed for individual use, such as for application onto mulch or other landscaping or marker materials located on a homeowner's property. Such method may be employed by using an apparatus comprising a container having means for emitting a foamed landscaping or marker composition (e.g., a nozzle) containing a pressurized landscaping or marker composition, the landscaping or marker composition comprising a solvent, a surfactant or a soluble gas dissolved in the solvent, and a treatment for landscaping or marker materials. An individual, such as a homeowner, can use this container, which may be in canister form, to apply a foamed landscaping or marker composition onto his landscaping or marker materials.

Figure 13:
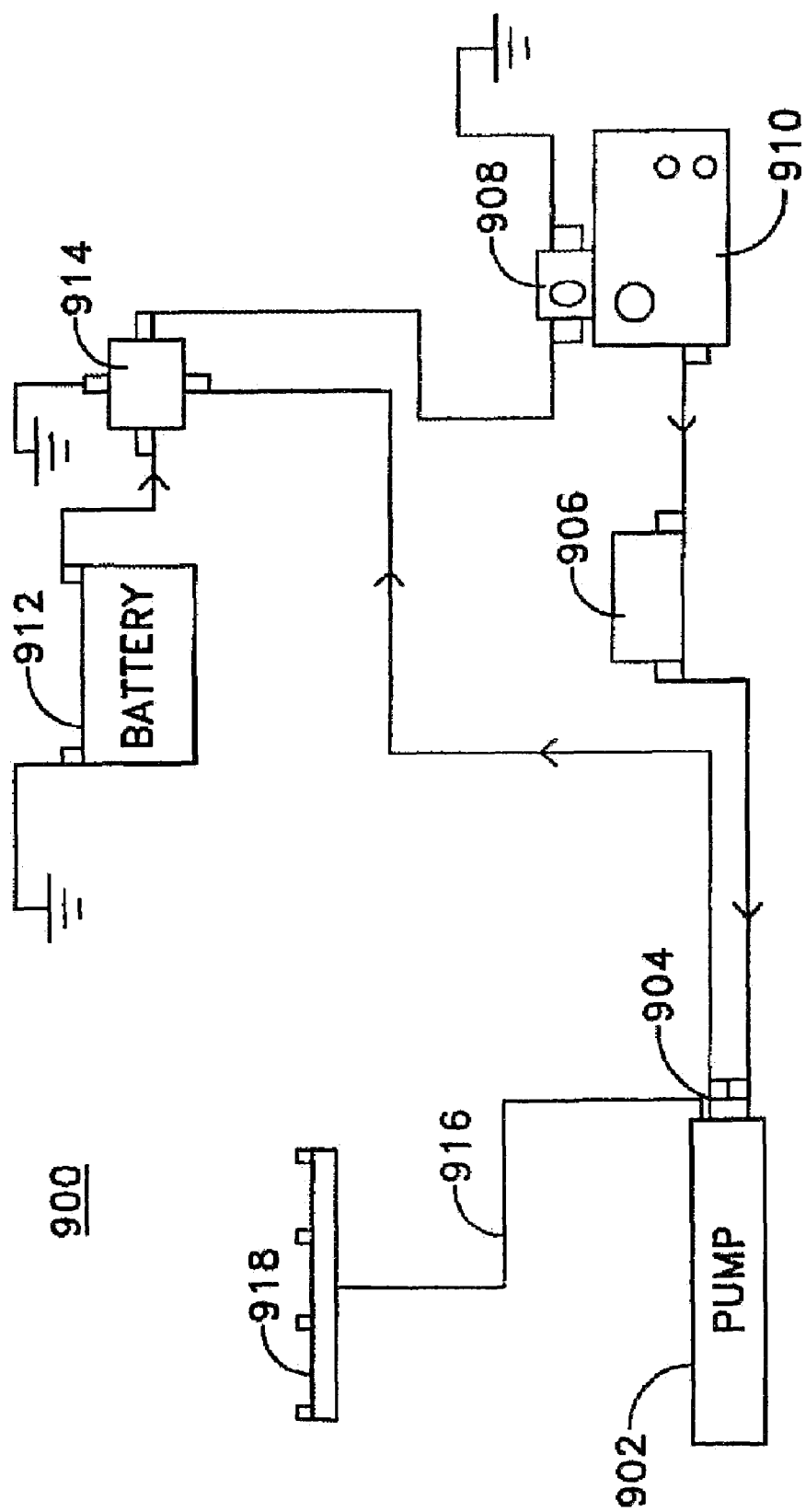
FIG. 13 is a schematic view of a high pressure detection system according to another aspect of the present invention.

Referring to FIG. 13, according to another aspect, a high pressure detection system 900 comprises a treatment pump 902, a pressure sensor/switch, 904, a fuse 906, an audio and/or visual alarm 908, a control panel 910, a battery 912, and a relay 914 for engagement of the pressure switch 904. In some embodiments the control panel is replaced by a programmable logic controller. In one embodiment the detection system 900 is part of a foaming system as described above. However, the detection system 900 may be included on any apparatus wherein a pump is used to apply a treatment material to landscaping or marker materials. As shown in FIG. 13, the treatment pump has attached thereto a discharge hose 916 which is connected to one or more nozzles or a manifold 918, including one or more nozzles, which disperses a treatment onto landscaping or marker materials. Currently, when coloring in mulch coloring machines, foreign materials, such as mulch particles, scale, or concentrated pigment, can clog nozzles resulting in poorly treated mulch or system failure. An early detection system, which alerts an operator when pressure is rising due to the onset of nozzle clogging, will allow the operator to correct the problem at a convenient time, before material quality begins to deteriorate and before a more serious system failure occurs.

Referring to FIG. 13, the pressure sensor 904 is located in the head of the pump just prior to a discharge hose 916. Preferably the pressure sensor 904 is set at 300 psi. The treatment material and solvent is preferably pumped at about 250 psi through the discharge hose 916 to the manifold 918. When clogging starts to occur, the pressure in the hose 916 and pump 902 will begin to rise. Once the pressure reaches 300 psi, the sensor 904 will send continuous voltage to a relay 914 that engages and sends voltage to an alarm 908 located on a control panel 910. A relief cartridge (not shown) is preferably employed and set at 400 psi. A 12 volt DC battery is preferably employed.

Although the high pressure detection system is advantageously used in connection with a foaming system, its use is not restricted thereto, but rather, the pressure detection system may be employed in the treatment of landscaping or marker materials whether via foaming or known aqueous methods, or other methods which would be obvious to one of ordinary skill in the art.

EXAMPLES

Further advantages of the embodiments are further described with reference to the following specific examples. The examples are merely intended to be illustrative and not to be construed as limiting the scope of the invention. In the following examples, the preferred methods for applying a foamed landscaping composition to landscaping materials, as described above, were employed and tested on wood products, in particular, aged wood mulch and freshly cut wood chips.

In examples one through twelve, foam was produced using a foam system according to the embodiment shown in FIG. 1 comprising a NTC-8 air driven Pneumatic Foam Unit, manufactured by Rusmar, Inc of West Chester, Pa., a 185 CFM portable compressor, a receptacle (e.g., a 55 gallon drum or larger tank) for holding the landscaping composition, a 1"×120' discharge hose, and in some cases, a four outlet manifold utilizing ½" MNPT, 80200 V-jet nozzles from Spraying Systems Co. of Wheaton, Ill. The liquid landscaping composition to be foamed was prepared by diluting the stated concentrate, providing the dilute composition described in each example. The liquid flow rate was 8.5 gpm, unless otherwise stated. The foam was discharged through the discharge hose. The foam outlet was either directly from the nozzle of the foam hose or through the four outlet manifold. The width of the manifold was altered to fit the individual application machine. The surfactant used in examples one to twelve was Witcolate 1247H, an alkyl ether sulfate having an ammonium salt.

Example One

Aged mulch was treated at minimal rate, 1.1 (cubic yard) CY/minute, in a trommel screener manufactured by Retech of Durand, Mich., with the screens blocked with plastic panels or liners. The foam injection was at the top of the rotating drum, adjacent the mulch feed entry, with the four nozzles of the four outlet manifold pointing down at about a 45° angle. The landscaping composition solution volume was 150 gallons, i.e., approximately 1250 pounds of solution, containing approximately 74 pounds (5.9 percent) of carbon black suspension, or 22 pounds (1.8 weight percent) of carbon, Witco 1247H surfactant at approximately 7000 ppm actives, and water. Approximately 3000 pounds (5 CY) of mulch was treated with the landscaping composition using 38 gallons of the above solution, indicating the use of 5.6 pounds of carbon (1.1 pounds/CY), and 317 pounds of water (10.6 weight percent, based on the feed mulch weight). The result was a thoroughly coated black mulch, even though the mulch was aged and thus more difficult to color.

Example Two

As in Example One, aged mulch was treated at minimal rate, 1.1 CY/minute, in a Retech trommel screener with the screens blocked with plastic panels. The foam injection was at the top of the rotating drum in the same location as in Example One, with the four nozzles pointing down at about a 45° angle. The solution volume was 150 gallons, 1250 pounds of solution, containing 180 pounds (14.4 percent) of red pigment suspension, or 135 pounds (10.8 percent) of red pigment, Witco 1247H at 7000 ppm actives, and water. Approximately 10800 pounds (18 CY) of mulch was treated using 123 gallons of solution, indicating 111 pounds of pigment (6.2 pounds/CY), and 1026 pounds of water (9.5 weight percent, based on the feed mulch weight). The result was a very red mulch, indicating that a lesser amount of pigment could be employed, even though the mulch was aged and thus more difficult to color.

Example Three

Aged mulch was treated at slow rate in a Fecon Rainbow Mulch Continuous Mixer. The foam injection manifold was at the top of the rotating augers at the exit end of the feeder hopper, with the four nozzles pointing vertically downward. The solution volume was 150 gallons, 1250 pounds of solution, containing 148 pounds (11.8 percent) of carbon black suspension (as in Example One), or 44.4 pounds (3.6 weight percent) of carbon, Witco 1247H at 7000 ppm actives, and water. With the feed rate set on the low range, 35 percent, the mulch output was excellent with good uniform black color. The maximum throughput was achieved at 77 percent. At higher mulch mass flow, the exit clogged before dumping onto the stacking conveyor because the chips were so dry. There was no moisture (liquid) to slurry them through the system. Based on the screw conveyor setting, the mulch flow rate was estimated to be 160 CY/hour or 2.7 CY/minute or 1620 pounds/minute. The mulch was warm and steamed in the open atmosphere and steamed even more during the treatment process. Assuming a correct estimate of the mulch mass flow rate, in theory, 4.4 weight percent moisture was added, not counting the moisture which vented from the system. A solids determination for the untreated mulch defined the solids level at 50.73 percent, while an equivalent determination for the treated mulch showed 50.58 percent. Thus, in fact, no measurable moisture was added to the mulch.

Example Four

Aged mulch was treated at the maximum rate in a Retech trommel screener. The foam injection was at the top of the rotating drum, as in Example One, with the four nozzles pointing down at about a 45° angle. The solution volume was 150 gallons, 1250 pounds of solution, containing 148 pounds (11.8 percent) of carbon black suspension (as in Example One), or 44.4 pounds (3.6 weight percent) of carbon, Witco 1247H at 7000 ppm actives, and water. The unit was operated at the maximum throughput allowed by the trommel screener while feeding liquid, as foam, at 8.5 gpm. The colored mulch was uniformly black and of excellent quality. The solids determination showed that the treated much was 49.53 percent solids, indicating that the treatment process added essentially no moisture to the mulch.

Example Five

The conditions of Example Four were repeated with freshly prepared wood chips, as opposed to mulch. These chips were standing trees within the previous 12 hours before being treated. The chips were very black and very well coated. The solids determination showed 53.03 percent, with no untreated data available.

Example Six

The foam system described above was attached to a Morbark 1200 Tub Grinder. The location of the nozzles was below the hammer mill and above the exit screw conveyor. Injection from the side (no manifold, no nozzles) perpendicular to the treated material exit flow or injection from the exit end (manifold with four nozzles) directed forward produced identical results. The same solution as in Example Four was employed. The feed material was the same as Example Five, converting chips into mulch while coloring at the same time. The coverage was excellent at lower feed rates, but as the feed rate increased the coverage declined indicative of too little foamed solution for the total flow rate of chips.

Example Seven

The foam system described above was attached to a Morbark Horizontal Whole Tree Chipper (see FIG. 8). The location of the foam injecting nozzles was on the downstream side of the chipper disc in the chipping chamber and about one inch above the chipper disc axle. This location allowed the injected foam to impinge on the chipper disc and then get distributed radially from the rotational force of the chipper disc. More importantly, this location allowed foam to enter the chipper receiver box behind the chipper disc, the first destination of all chips going through the system. The same solution as in Example Four was employed. The feed material was whole trees and very large branches, which were converted to chips while coloring at the same time. The coverage was excellent at lower feed rates, but unlike all other tested devices, the chip production on this device was not constant. As the tree trunk enters the chipper, the chip production is very high and then drops as the branches are chipped. Thus, the coverage varies in quality, off and on, as the trees are fed.

Example Eight

The conditions of Example One were repeated, except that the mulch flow rate was approximately 2.4 CY/min, the landscaping composition solution volume was 265 gallons, 2210 pounds, and contained about 10,000 ppm actives concentration of Witco 1247H and 250 pounds of carbon black dispersion (or 75 pounds of carbon pigment or 3.4 weight percent). Approximately 74 CY of mulch was treated with the 265 gallons of solution or 3.6 gallons/CY. The resultant mulch was black, although some speckling occurred. Two moisture samples of the treated mulch were taken averaging 60.38 weight percent solids. An untreated mulch sample was tested to be 60.59 weight percent solids, indicating that the treatment process added essentially no moisture to the mulch.

Example Nine

The conditions of Example Eight were repeated, except 30 gallons of red pigment dispersion (540 pounds of dispersion, 405 pounds of iron oxide pigment, 18.3 weight percent pigment) and 12,500 ppm actives of Witco 1247H were used in the landscaping composition solution. The mulch was a solid red with only minor speckling. One moisture sample of the treated mulch was tested to be 56.12 weight percent solids.

Example Ten

The conditions of Example Eight were repeated, except that the mulch mass flow rate was 289 CY/hour, and 12,500 ppm actives of Witco 1247H and twice as much carbon black dispersion (500 pounds of dispersion, 150 pounds of carbon black pigment) were used in the landscaping composition solution (pigment concentration of 6.8 weight percent). Approximately 144 CY of mulch was treated with 265 gallons (2210 pounds) of solution containing 150 pounds of carbon pigment. Thus, 1.84 gallons of solution containing 1.04 pounds of carbon pigment were used to treat one CY of mulch. One moisture sample of the treated mulch was tested to be 55.27 weight percent solids.

Example Eleven

The conditions of Example Eight were repeated, except that the mulch flow rate was about 250 CY/hour, the total volume of landscaping solution was about 265 gallons (2210 pounds) having 150 lbs of carbon (6.8 weight percent) and Witco 1247H (12700 ppm actives) and the delivery rate of the foamed solution was about 8.5 gpm. Approximately 130 CY of mulch was treated, the resultant mulch being slightly speckled.

The mulch flow rate was then decreased to approximately 200 CY/hr and the pitch of the trommel drum was lowered to about 3° while slowing the rotational speed of the drum. The resultant mulch product was thoroughly blackened and without speckling.

Example Twelve

The conditions of Example Eleven were repeated, except that the carbon pigment was replaced by 370 lbs of red pigment dispersion, 75 weight percent pigment (278 lbs pigment, 12.6 weight percent in foamed solution), the delivery rate of the foamed solution was 1.0 gpm (2.6 gallons of fluid/CY), and the mulch flow rate was approximately 200 CY/hr. Approximately 103 CY of mulch was treated, the resultant mulch being completely covered.

The following Example Thirteen used the foaming system shown in FIG. 2. The surfactant used in the Examples Thirteen through Sixteen was Stepan CA-207. The surfactant actives concentration varied between 2000 and 6000 ppm.

Example Thirteen

The coloring machine used for this example was a Morbark 4000 P operating at 200 CY/hour with dry, untreated mulch. The foam discharge location was similar to the Fecon unit described in Example Three, located at the exit (discharge) end of the feed screw conveyors. The flow rate of the colorant composition was 22 gpm, and the experiment operated for 30 minutes. The total flow was 660 gallons, while the total mulch treated was 100 CY; therefore the liquid addition to the mulch was 6.6 gallons/CY. The carbon black dispersion consumed weighed 550 pounds and contained 165 pounds of pigment, therefore, 1.65 pounds of pigment/CY. The mulch was well covered at this treatment rate.

During this experiment, in order to analyze the benefit of the foam delivery, and after obtaining the above mentioned well covered mulch, the control valve for the compressed air was shut, thereby stopping the foam production, but allowing the liquid composition to continue flowing. Within 2 minutes (the time it takes to adjust the inventory of the Morbark unit), the exiting mulch was very poorly colored (poor color distribution) and continued that way for several minutes. The air control valve was re-opened, and, again, within about two minutes, the mulch exiting the Morbark unit was properly colored. This on-and-off sequence was repeated several times with equivalent results, which demonstrated the advantage of the foam delivery.

Similar experiments using the Retech trommel screener showed the same effect when the foam delivery was interrupted by stopping the air delivery.

Example Fourteen

The experimental prototype foam unit as shown in FIG. 2 was reconfigured to use an air aspirated foam delivery system, as shown in FIG. 3B. The compressed air was disconnected and the composite liquid flow was pumped at full delivery rate for the employed Cat pump, 22 gpm, against the discharge orifice plates of four air aspirated nozzles. The air aspirated nozzles were Scotty 4003 Air Aspirated Fire Fighting Nozzles manufactured by Scott Plastics from Vancouver, British Columbia. The operating pressure was about 275 psig. The mulch coloring machine was a Retech trommel screener operating at 150 CY/hour. Carbon black dispersion, 60 gallons, 630 pounds, was fed over a thirty minute period. The total liquid flow was 660 gallons, or 8.8 gallons/CY, while the total pigment applied was 189 pounds of carbon, or 2.5 pounds/CY. The colored mulch was thoroughly and evenly colored.

Example Fifteen

A foaming unit according to FIG. 3A was used wherein the treatment, or colorant, pump was a DELASCO model PCM-DL18 pump, manufactured by Delasco Manufacturing of Vanves Cedex, France, the second pump was a APLEX model SC-45L pump, manufactured by F. E. Myers of Ashland, Ohio. The DL-18 pump dispensed colorant into the water stream at the inlet side of the APLEX pump. The combined solution was pressurized to 300 psi with the APLEX pump. This solution was pumped through a liquid line to the air aspirated nozzles described in Example Fourteen. A drum of Hamburger red gelled dispersion Product No. 11601, weighing 500 pounds, and to which 8 gallons of Stepan CA-207 surfactant was added, was used as the treatment material to treat dry, untreated mulch. 5.42 pounds of dispersion and 5.8 gallons of water were used per cubic yard of mulch. The result was a thoroughly coated red mulch.

Example Sixteen

The conditions of Example Fifteen were repeated except that the landscaping material was Mason Sand and a drum of Hamburger red gelled dispersion Product No. 11598, weighing 500 pounds, and to which 8 gallons of Stepan CA-207 surfactant was added was used as the treatment material. 5.0 pounds of gelled dispersion and 10 gallons of water were used per cubic yard of sand. The result was a thoroughly coated red sand that was slightly wet indicating that less water may produce similar, but drier results.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A method for treating a marker material comprising:
   combining at least one treatment for the marker material, a foaming agent and a solvent to form a marker composition;
   foaming the marker composition to form a foamed marker composition; and
   applying the foamed marker composition to the marker material to form a treated marker material;
   wherein the treated marker material persists after the marker composition is no longer foamed.

2. The method of claim 1, wherein the marker material is a salt.

3. The method of claim 2, wherein the salt is selected from the group consisting of sodium chloride, calcium chloride, potassium chloride, magnesium chloride, and any combination of the above.

4. The method of claim 1 wherein the treatment comprises a colorant pigment.

5. A treated marker material comprising:
   a marker material; and
   a marker composition applied to the marker material,
   wherein the marker composition includes:
      a treatment for the marker material;
      a foaming agent; and
      a solvent; and
   wherein the treated marker material persists after the marker composition is no longer foamed.

6. The treated marker material of claim 5, wherein the marker material is a salt and the treatment is a colorant pigment.

7. The method of claim 1, wherein the step of applying the foamed marker composition to the marker material delivers the treatment to the marker material.

8. The treated marker material of claim 5, wherein the marker composition is foamed prior to application to the marker material.

9. The treated marker material of claim 8, wherein application of the marker composition to the marker material delivers the treatment to the marker material.

10. The method of claim 1, wherein the treated marker material contains no foam when it is applied to a location to be marked.

11. The method of claim 1, wherein the step of applying the foamed marker composition to the marker material further comprises the substep of mixing the foamed marker composition with the marker material.

12. The method of claim 1, wherein the step of applying occurs in a landscaping material processing machine.

13. The method of claim 1 further comprising the step of applying the treated marker material to a location to mark the location.

* * * * *